(12) United States Patent
Reshetouski et al.

(10) Patent No.: US 12,360,297 B2
(45) Date of Patent: Jul. 15, 2025

(54) IMAGING DEVICE, OPTICAL ELEMENT, IMAGE PROCESSING SYSTEM, AND IMAGE PROCESSING METHOD

(71) Applicant: SONY GROUP CORPORATION, Tokyo (JP)

(72) Inventors: Ilya Reshetouski, Tokyo (JP); Atsushi Ito, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 608 days.

(21) Appl. No.: 17/778,290

(22) PCT Filed: Dec. 9, 2020

(86) PCT No.: PCT/JP2020/045785
§ 371 (c)(1),
(2) Date: May 19, 2022

(87) PCT Pub. No.: WO2021/125000
PCT Pub. Date: Jun. 24, 2021

(65) Prior Publication Data
US 2023/0010599 A1   Jan. 12, 2023

(30) Foreign Application Priority Data

Dec. 16, 2019   (JP) .................................. 2019-226835

(51) Int. Cl.
*G02B 5/18*   (2006.01)
*G02B 5/20*   (2006.01)
(Continued)

(52) U.S. Cl.
CPC ......... *G02B 5/1842* (2013.01); *G02B 5/1876* (2013.01); *G02B 5/20* (2013.01);
(Continued)

(58) Field of Classification Search
CPC ...... G02B 5/1842; G02B 5/1876; G02B 5/20; H04N 23/80; H04N 23/951; H04N 23/955; H04N 23/55; H04N 25/00; H04N 23/54

See application file for complete search history.

(56) References Cited

U.S. PATENT DOCUMENTS 3,346,862 A * 10/1967 Raudsep .................. H03D 1/00
                                                                          367/901
4,209,780 A    6/1980 Fenimore et al.
(Continued)

FOREIGN PATENT DOCUMENTS

JP   2009-165115 A   7/2009
JP   2018-061109 A   4/2018
(Continued)

OTHER PUBLICATIONS

Wang et al., An Angle-Sensitive CMOS Imager for Single-Sensor 3D Photography, IEEE International Solid-State Circuits Conference, 2011, pp. 412-413, IEEE.
(Continued)

*Primary Examiner* — Hung H Lam
(74) *Attorney, Agent, or Firm* — Paratus Law Group, PLLC

(57) ABSTRACT

Provided is an imaging device (100) including: a line sensor or an area sensor (50) having an aspect ratio different from that of a scene; and an optical element (10) having a predetermined pattern and superimposed on the line sensor or the area sensor, wherein in the optical element, an autocorrelation function of the predetermined pattern including a plurality of basic patterns repeated while being periodically positionally displaced has a peak and side lobes, and the side lobes are constant or substantially constant.

14 Claims, 27 Drawing Sheets

(51) Int. Cl.
*H04N 23/80* (2023.01)
*H04N 23/951* (2023.01)
*H04N 23/955* (2023.01)

(52) U.S. Cl.
CPC ........... *H04N 23/80* (2023.01); *H04N 23/951* (2023.01); *H04N 23/955* (2023.01)

(56) References Cited

U.S. PATENT DOCUMENTS

| | | | |
|---|---|---|---|
| 4,892,408 A * | 1/1990 | Pernick | G06E 3/003 |
| | | | 356/400 |
| 5,546,367 A * | 8/1996 | Yoshimura | G11B 7/0956 |
| | | | 369/124.05 |
| 5,920,430 A * | 7/1999 | Grycewicz | G02B 27/46 |
| | | | 356/509 |
| 8,736,847 B2 * | 5/2014 | Shirley | G01B 11/2441 |
| | | | 356/510 |
| 8,746,569 B2 | 6/2014 | Olmstead | |
| 11,782,139 B2 * | 10/2023 | Wagner | G01S 7/4818 |
| | | | 356/4.01 |
| 2011/0228895 A1 | 9/2011 | Ridley et al. | |
| 2015/0219808 A1 | 8/2015 | Gill et al. | |
| 2021/0405201 A1 * | 12/2021 | Wagner | G01S 17/894 |

FOREIGN PATENT DOCUMENTS

| | | |
|---|---|---|
| WO | WO 2016/123529 A1 | 8/2016 |
| WO | WO 2018/023039 A1 | 2/2018 |
| WO | WO 2018/064660 A1 | 4/2018 |

OTHER PUBLICATIONS

Luke et al., Binary arrays with perfect odd-periodic autocorrelation, Applied Optics, Sep. 10, 1997, pp. 6612-6619.
Finger et al., Hexagonal Uniformly Redundant Arrays for Coded-Aperture Imaging, 19$^{th}$ International Cosmic Ray Conference, Aug. 1, 1985, pp. 295-298, vol. 3.
Wang et al., LiSens—A Scalable Architecture for Video Compressive Sensing, ICCP, 2015, pp. 1-32.
Busboom et al., Uniformly Redundant Arrays, Experimental Astronomy, 1998, pp. 97-123, vol. 8.
Antipa et al., Video from Stills: Lensless Imaging with Rolling Shutter, arXiv, May 30, 2019, pp. 1-8.

* cited by examiner

IMAGING DEVICE, OPTICAL ELEMENT, IMAGE PROCESSING SYSTEM, AND IMAGE PROCESSING METHOD

CROSS REFERENCE TO PRIOR APPLICATION

This application is a National Stage Patent Application of PCT International Patent Application No. PCT/JP2020/045785 (filed on Dec. 9, 2020) under 35 U.S.C. § 371, which claims priority to Japanese Patent Application No. 2019-226835 (filed on Dec. 16, 2019), which are all hereby incorporated by reference in their entirety.

FIELD

The present disclosure relates to an imaging device, an optical element, an image processing system, and an image processing method.

BACKGROUND

In general, a lensless camera (imaging device) can obtain a captured image by arranging a mask (optical element) configured by arranging light transmission filters and light non-transmission filters in a two-dimensional pattern in front of an image sensor, and reconstructing a scene from observation data of the image sensor. For example, an the lensless camera, information such as how light is projected on the image sensor via the mask is defined in advance as a matrix, and a captured image of an actual scene is reconstructed using the matrix and the observation data of the image sensor. Since such a lensless camera does not use an optical lens or the like, it is possible to realize downsizing, weight reduction, cost reduction, and the like of the imaging device.

CITATION LIST

Patent Literature

Patent Literature 1: U.S. Pat. No. 8,746,569
Patent Literature 2: WO 8016/123529 A
Patent Literature 3: WO 2018/023039 A
Patent Literature 4: U.S. Pat. No. 4,209,780
Patent Literature 5: WO 2018/064660 A
Patent Literature 6: US 2015/0219808 A

Non Patent Literature

Non. Patent Literature 1: UNIFORMLY REDUNDANT ARRAYS, A. BUSBOOM, H. ELDERS-BOLL, AND H. D. SCHOTTEN, 1997
Non Patent Literature 2: LiSens—A Scalable Architecture for Video Compressive Sensing, Jian Wang, Mohit Gupta, and Aswin C. Sankaranarayanan, ICCP, 2015
Non Patent Literature 3: An angle-sensitive CMOS imager for single-sensor 3D photograph, Albert Wang; Patrick R. Gill; Alyosha Molnar, IEEE, 2011
Non Patent Literature 4: Video from Stills: Lensless Imaging with Rolling Shutter, Nick. Antipa, Patrick Oare, Emrah Bostan, Ren. Ng, Laura Waller; ICCP 2019
Non Patent Literature 5: Binary arrays with perfect odd-periodic autocorrelation, Hans Dieter Luke and Busboom; 10 Sep. 1997/Vol. 36, No. 26/APPLIED OPTICS/pp, 6612-6619
Non Patent Literature 6: Hexagonal uniformly redundant arrays for coded-aperture imaging, M. H. Finger, T. A. Prince, In NASA. Goddard Space Flight Center 19th Intern. Cosmic Ray Conf., Vol. 3 p 295-298

SUMMARY

Technical Problem

However, in a conventional imaging device, an aspect ratio (a longitudinal/lateral ratio) of a scene to be imaged and an aspect ratio of an image sensor that receives light from the scene are generally the same or approximate. In addition, also in the lensless camera, in a case where the aspect ratio of the scene is greatly different from the aspect ratio of the image sensor, it is difficult to reconstruct the captured image of the actual scene without deteriorating quality.

Therefore, the present disclosure proposes an imaging device, an optical element, an image processing system, and an image processing method that are capable of easily reconstructing a captured image of an actual scene without deteriorating quality, by using an image sensor having an aspect ratio different from the aspect ratio of the scene.

Solution to Problem

According to the present disclosure, an imaging device is provided The imaging device includes a line sensor or an area sensor having an aspect ratio different from an aspect ratio of a scene, and an optical element having a predetermined pattern and superimposed on the line sensor or the area sensor. In the optical element, an autocorrelation function of the predetermined pattern including a plurality of basic patterns repeated while being periodically positionally displaced has a peak and side lobes, and the side lobes are constant or substantially constant.

Further, according to the present disclosure, an optical element is provided The optical element includes a predetermined pattern and is superimposed on a line sensor or an area sensor having an aspect ratio different from an aspect ratio of a scene. In the optical element, an autocorrelation function of the predetermined pattern including a plurality of basic patterns repeated while being periodically positionally displaced has a peak and side lobes, and the side lobes are constant or substantially constant.

Further, according to the present disclosure, an image processing system is provided The image processing system includes: an acquisition unit that acquires observation data observed by a line sensor or an area sensor having an aspect ratio different from an aspect ratio of a scene based on light from the scene transmitted through an optical element having a predetermined pattern and superimposed on the line sensor or the area sensor; and a processing unit that generates a captured image of the scene by reconstructing the observation data. In the optical element, an autocorrelation function of the predetermined pattern including a plurality of basic patterns repeated while being periodically positionally displaced has a peak and side lobes, and the side lobes are constant or substantially constant.

Further, according to the present disclosure, an image processing method is provided The image processing method includes: acquiring observation data observed by a line sensor or an area sensor having an aspect ratio different from an aspect ratio of a scene based on light from the scene transmitted through an optical element having a predetermined pattern and superimposed on the line sensor or the area sensor; and generating a captured image of the scene by reconstructing the observation data. In the optical element, an autocorrelation function of the predetermined pattern including a plurality of basic patterns repeated while being periodically positionally displaced has a peak and side lobes, and the side lobes are constant or substantially constant.

DESCRIPTION OF EMBODIMENTS

Figure 1:
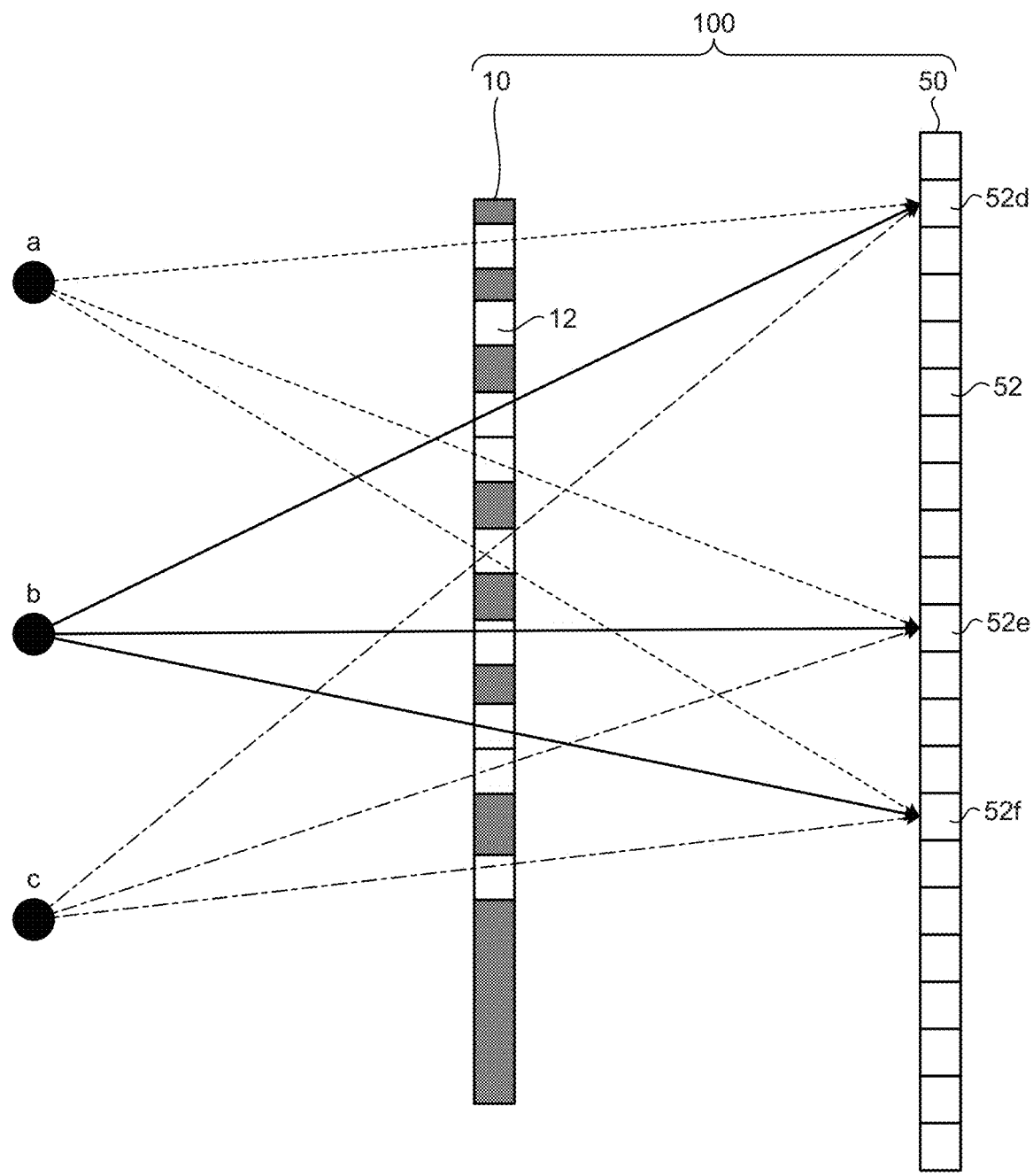
FIG. 1 is an explanatory diagram for explaining a principle of a lensless camera.

Hereinafter, preferred embodiments of the present disclosure will be described in detail with reference to the accompanying drawings. Note that, in the present specification and the drawings, components having substantially the same functional configuration are denoted by the same reference signs, and redundant description is omitted. Furthermore, in the present specification and the drawings, similar components of different embodiments may be distinguished by adding different alphabets after the same reference signs. However, in a case where it is not necessary to particularly distinguish each of similar components, only the same reference sign is assigned.

An embodiment of the present disclosure described below will he described by taking as an example a case where the present disclosure is applied to a lensless camera However, the embodiment of the present disclosure is riot limited to being applied to the above-described lensless camera, and may be applied to other imaging systems and the like.

Furthermore, in the following description, substantially constant side lobes means not only a mathematically constant case but also a case where there is an allowable difference in reconstruction of a captured image to be described later (for example, from the viewpoint of the quality of the captured image obtained by the reconstructon or the like).

Note that the description will be given in the following order.

1. Principle of lensless camera
2. Background until creation of embodiment according to present disclosure
3. Embodiments
  3.1 Optical element
  3.2 Method of generating two-dimensional pattern.
  3.3 Mismatch between aspect ratio of scene and aspect ratio of image sensor
  3.4 Example of binary mask 10
  3.5 Another example of binary mask 10
  3.6 Imaging of one-dimensional scene by two-dimensional image sensor (area sensor)
  3.7 Imaging of two-dimensional scene by one-dimensional image sensor (line sensor)
  3.8 Imaging of two-dimensional scene by two-dimensional image sensor (area sensor)
  3.9 Rolling shutter system
  3.10 Image processing apparatus
  3.11 Image processing method
  3.12 Summary
4. Hardware configuration
5. Application example to endoscopic surgery system
6. Application example to mobile body
7. Supplement <<1. Principle of Lensless Cameras>

First, before describing details of an embodiment of the present disclosure, an outline and a principle of a lensless camera (imaging device) will be described with reference to FIG. 1. FIG. 1 is an explanatory diagram for describing a principle of a lensless camera As illustrated in FIG. 1, an imaging device (a lensless camera) 100 includes a binary mask (optical element) 10 and an image sensor 50. The binary mask 10 is, for example, a mask having a predetermined pattern including a plurality of light transmission filters 12 and a plurality of light non-transmission filters (not illustrated) arranged in a two-dimensional lattice pattern. Further, the image sensor 50 includes a plurality of pixels 52 arranged in a two-dimensional lattice pattern or in one column (or one row) on a light receiving surface. Then, each of the pixels 52 receives light from each point of a scene to be imaged, thereby generating an electronic signal (observation data) Furthermore, in the lensless camera, a captured image of an actual scene can be obtained by projecting the electronic signal to a position on a plane corresponding to a position of the corresponding pixel 52. At this time, light from each point of the scene passes through the light transmission filters 12 of the binary mask 10 and is received by each of the pixels 52 of the image sensor 50.

Furthermore, details of the imaging principle in the imaging device 100 will be described Hereinafter, light from each point of the scene to be imaged will be described as light from each of light sources a, b, and c illustrated in FIG. 1. For example, in the example illustrated in FIG. 1, light from the light source a passes through the light transmission filters 12 of the binary mask 10 and is received by pixels 52d, 52e, and 52f. Further, light from the light source b passes through the light transmission filters 12 of the binary mask 10 and is received by the pixels 52d, 52e, and 52f. Furthermore, light from the light source c passes through the light transmission filters 12 of the binary mask 10 and is received by the pixels 52d, 52e, and 52f. Therefore, in a case where light intensities of the light sources a, b, and c are a, b, and c, light intensities $I_d$, $I_e$, and $I_f$ received by the pixels 52d, 52e, and 52f are expressed by the following formula (1) Note that, in the formula (1), $\alpha_1$ to $\alpha_3$, $\beta_1$ to $\beta_3$, and $\gamma_1$ to $\gamma_3$ are transmission coefficients of the light transmission filters 12 of the binary mask 10.

$$I_d = \alpha_1 \times a + \beta_1 \times b + \gamma_1 \times c$$

$$I_e = \alpha_2 \times a + \beta_2 \times b + \gamma_2 \times c$$

$$I_f = \alpha_3 \times a + \beta_3 \times b + \gamma_3 \times c \quad (1)$$

As can be seen from the above formula (1), the light received by each of the pixels 52d, 52e, and 52f is a mixture of the light emitted from each of the light sources a, b, and c, and does not include only the light (for example, light from one light source of FIG. 1) from a subject included in the actual scene. Accordingly, an initial captured image of the actual scene that can be acquired by the imaging device 100 is not an image of the subject included in the scene and is blurred due to superimposition of the image. Therefore, in imaging using the imaging device 100, in order to obtain a captured image of an actual scene such as a formed subject, a captured image of an actual scene such as a desired subject is reconstructed from the superimposed image.

Here, in a case where light emitted from a plurality of points in a scene is expressed as a light vector X, and observation data of the plurality of pixels 52 that receive the light is expressed as an observation value vector Y, a relationship between the light vector X and the observation value vector Y can be expressed by the following formula (2).

$$\vec{Y} = F\vec{X} \quad (2)$$

Note that F in the above formula (2) is a matrix representing the transmission coefficient of each of the light transmission filters 12 of the binary mask 10 having the two-dimensional pattern.

Therefore, in the imaging using the imaging device 100, in order to reconstruct the captured image of the actual scene such as the formed subject, the light vector X satisfying the above formula (2) for the light from the subject or the like included in the scene may be obtained from the observation value vector Y. Specifically, since the observation value vector Y becomes clear by the image sensor 50, the light vector X can be calculated by solving the matrix F for X. For this purpose, the pattern of the binary mask 10 is required to satisfy a condition for obtaining the solution.

<<2. Background Until Creation of Embodiment According to Present Disclosure>>

Next, in view of the above-described situation, the background until creation of the embodiment according to the present disclosure by the present inventors will be described.

By the way, in a conventional imaging device, since light is condensed on the image sensor 50 using an optical lens or a mirror, an aspect ratio of a scene to be imaged and an aspect ratio of the image sensor 50 that receives light from the scene are generally the same or approximate.

For example, Patent Literature 1 describes imaging using a two-dimensional image sensor having an aspect ratio different from that of a one-dimensional scene. Specifically, in Patent Literature 1 described above, imaging of a single (one-dimensional) barcode by a two-dimensional image sensor is enabled by using a plurality of mirrors and optical lenses. That is, in Patent Literature 1 described above, imaging can be performed even if the aspect ratio of the scene and the aspect ratio of the image sensor are mismatched, but since the plurality of mirrors and optical lenses are required, it is inevitable that the configuration of the imaging device becomes complicated. Further, in Non Patent Literature 2 described above, imaging of a two-dimensional scene by a one-dimensional image sensor (line sensor) is enabled by using a compressed sensing method. Although the aspect ratio of a scene that can be imaged is limited in Patent Literature 1, there is no such limitation in a technique proposed in Non Patent Literature 2. However, in Non Patent Literature 2 described above, when a captured image of one scene is reconstructed, it is required to perform imaging a plurality of times. Furthermore, in Non Patent Literature 2 described above, a complicated configuration such as a digital micromirror device (DMD) is required for imaging.

Therefore, in order to overcome the above-described disadvantages of Patent Literature 1 and Non Patent Literature 2 described above, use of a lensless camera has been studied. This is because the lensless camera does not require an optical lens or the like and thus does not require a complicated configuration. As such an alternative technique, for example, a technique disclosed in Non Patent Literature 4 can be mentioned Specifically, in Non Patent Literature 4 described above, a pseudo random phase diffusion plate is used instead of the optical lens. The diffusion plate projects light from each point of a two-dimensional scene onto an image sensor as a condensing pattern having pseudo randomness and a high contrast. Then, in the technique disclosed in Non Patent Literature 4 described above, a captured image of a two-dimensional scene can be reconstructed by observation data (signal) acquired by the image sensor. Further, in the technique disclosed in Non Patent Literature 4 described above, it is possible to acquire a plurality of consecutive captured images at a high frame rate from one imaging by a rolling shutter system. Furthermore, in Non Patent Literature 4 described above, since the condensing pattern by the diffusion plate has a high contrast and pseudo randomness, the observation data (signal) acquired by the image sensor has an autocorrelation function having a sharp peak and having very small side lobes with respect to the peak. Therefore, according to the diffusion plate capable of generating the condensing pattern as described above, the observation data having the autocorrelation function as described above can be obtained, so that the above formula (2) can be solved As a result, in the technique disclosed in Non Patent Literature 4, a captured image of an actual scene can be reconstructed from the observation data acquired by the image sensor.

However, as a result of repeated studies by the present inventors, it has become clear that the technique disclosed in Non Patent Literature 4 has the following disadvantages.

First, in Non Patent Literature 4 described above, the diffusion plate projects the condensing pattern having pseudo randomness and a high contrast. However, Non Patent Literature 4 described above, the autocorrelation function of the condensing pattern has a sharp peak and has very small side lobes with respect to the peak, but the side lobes are not constant (uniform). Then, in Non Patent Literature 4 described above, in a case where the aspect ratio of the scene and the aspect ratio of the image sensor are mismatched, since the side lobes are not constant, it becomes difficult to solve the above formula (2). As a result, in Non Patent Literature 4 described above, the quality of the reconstructed captured image of the actual scene is degraded. Note that, according to the study of the present inventors, even if the aspect ratio of the scene and the, aspect ratio of the image sensor are mismatched, if the, autocorrelation function has a sharp peak, has very small side lobes with respect to the peak, and further has substantially constant (desirably, constant) side lobes (if the autocorrelation function can be approximated to a delta function), the above formula (2) can be efficiently and robustly solved for X. Then, if the calculation can be performed in this way, it is possible to avoid deterioration in quality of the reconstructed captured image.

In addition, in Non Patent Literature 4 described above, it is difficult to avoid sparse sampling by, the image sensor due to the pseudo randomness of the pattern of the diffusion plate. Therefore, in Non Patent Literature 4 described above, since the sampling is sparse, in a case where the captured image of the actual scene is reconstructed from the sparsely sampled observation data (signal), there is a high probability that the quality and uniformity deteriorate. Accordingly, in order to solve the above problem caused by sparse sampling, in Non Patent Literature 4 described above, compression sensing is applied to each scanning line (Specifically, one scanning line includes a plurality of pixels arranged along a row direction) of the image sensor. However, it is difficult to apply such a method to imaging a scene having a high spatial or temporal density, and it is difficult to avoid an increase in load of image processing in an image processing system.

Furthermore, in Non Patent Literature 4 described above, calibration of an imaging device is required in order to use the diffusion plate as described above.

Therefore, in view of such a situation, the present inventors have created embodiments of the present disclosure described below. In the embodiment of the present disclosure, by using an optical element (for example, a binary mask 10) as described below, each piece of observation data (signal) based on light from each point of a scene superimposed and acquired in each pixel (region) 52 of the image sensor 50 is encoded. Then, since the optical element has a predetermined pattern having an autocorrelation function having a sharp peak and having very small side lobes with respect to the peak, the above formula can be solved for X. As a result, according to the embodiment of the present disclosure, a captured image of an actual scene, can be reconstructed from the observation data.

Further, since the predetermined pattern of the optical element has substantially constant (desirably constant) (uniform) side lobes, even if the aspect ratio of the scene and the aspect ratio of the image sensor are mismatched, the above formula (2) can be efficiently and robustly solved for X. As a result, according to the embodiment of the present disclosure, it is possible to avoid deterioration in quality of the reconstructed captured image. Furthermore, a two-dimensional predetermined pattern including a plurality of two-dimensional basic patterns repeated while being periodically positionally displaced n the optical element can be easily generated by folding a one-dimensional pattern having an autocorrelation function of substantially constant (desirably constant) side lobes on the basis of a predetermined rule.

That is, according to such an embodiment of the present disclosure, even if the aspect ratio of the scene and the aspect ratio of the image sensor are mismatched, the captured image of the actual scene can be easily reconstructed using the imaging device 100 having a simple configuration without deteriorating the quality. According to the present embodiment, for example, a single (one-dimensional) barcode can be imaged by the two-dimensional image sensor 50, and a two-dimensional scene can be imaged by the one-dimensional image sensor (line sensor) 50.

Further, according to the embodiment of the present disclosure, since the imaging device has a simple configuration, by suitably forming the optical element so as to have the above-described pattern, calibration of the imaging system can be made unnecessary, and eventually, imaging can be easily performed.

Furthermore, in the embodiment of the present disclosure, for example, the binary mask 10 having a predetermined pattern including the light transmission filters 12 and the light non-transmission filters (not illustrated) arranged in a two-dimensional lattice pattern can be used as the optical element. Moreover, in the embodiment of the present disclosure, for example, the binary mask 10 having a predetermined pattern including the light transmission filters 12 and the light non-transmission filters (not illustrated) arranged in a Fresnel pattern can be used as the optical element. Further, in the embodiment of the present disclosure, for example, a diffraction grating element can be used as the optical element. That is, in the present embodiment, it can be said that the degree of freedom in designing the optical element is high.

Further, in the present embodiment, as described above, each of the observation data (signals) based on the light from each point of the scene superimposed and acquired in each pixel (region) 52 of the image sensor 50 can be encoded. Therefore, according to the present embodiment, even in the case of being applied to the rolling shutter system, it is possible to acquire a plurality of consecutive captured images at a high frame rate from one imaging. Furthermore, according to the present embodiment, it is easy to specify observation data corresponding to each scanning line or each scanning line group (Specifically, each scanning line group includes a predetermined number of scanning lines) of the image sensor 50. Moreover, according to the present embodiment, it is possible to uniformly maintain the quality, between the captured images obtained by reconstructing the observation data acquired in each scanning line or each scanning line group.

Hereinafter, details of the embodiments of the present disclosure created by the present inventors will be sequentially described <<3. Embodiments>>

<3.1 Optical Element>

Figure 2:
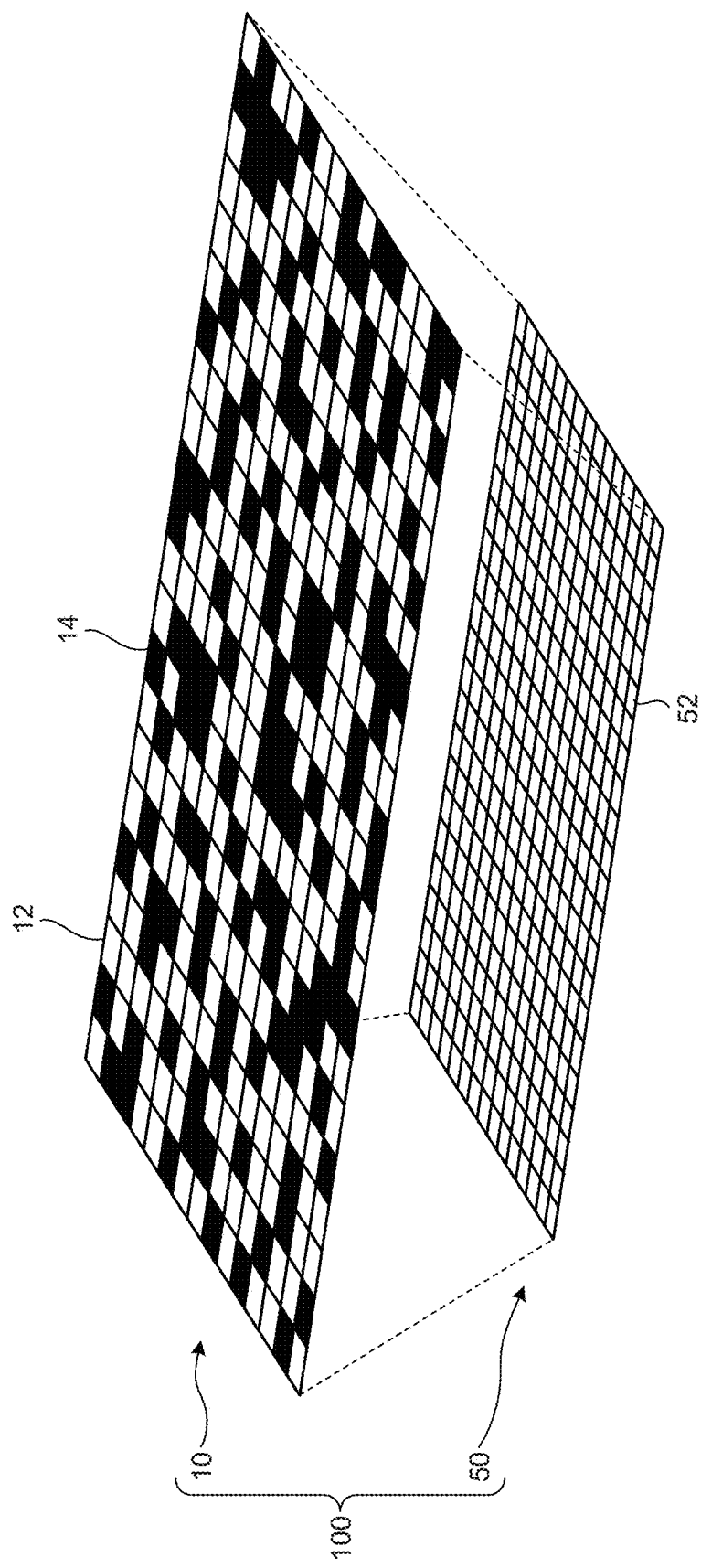
FIG. 2 is an explanatory diagram for explaining an example of a configuration of an imaging device 100 according to an embodiment of the present disclosure.
Figure 3:
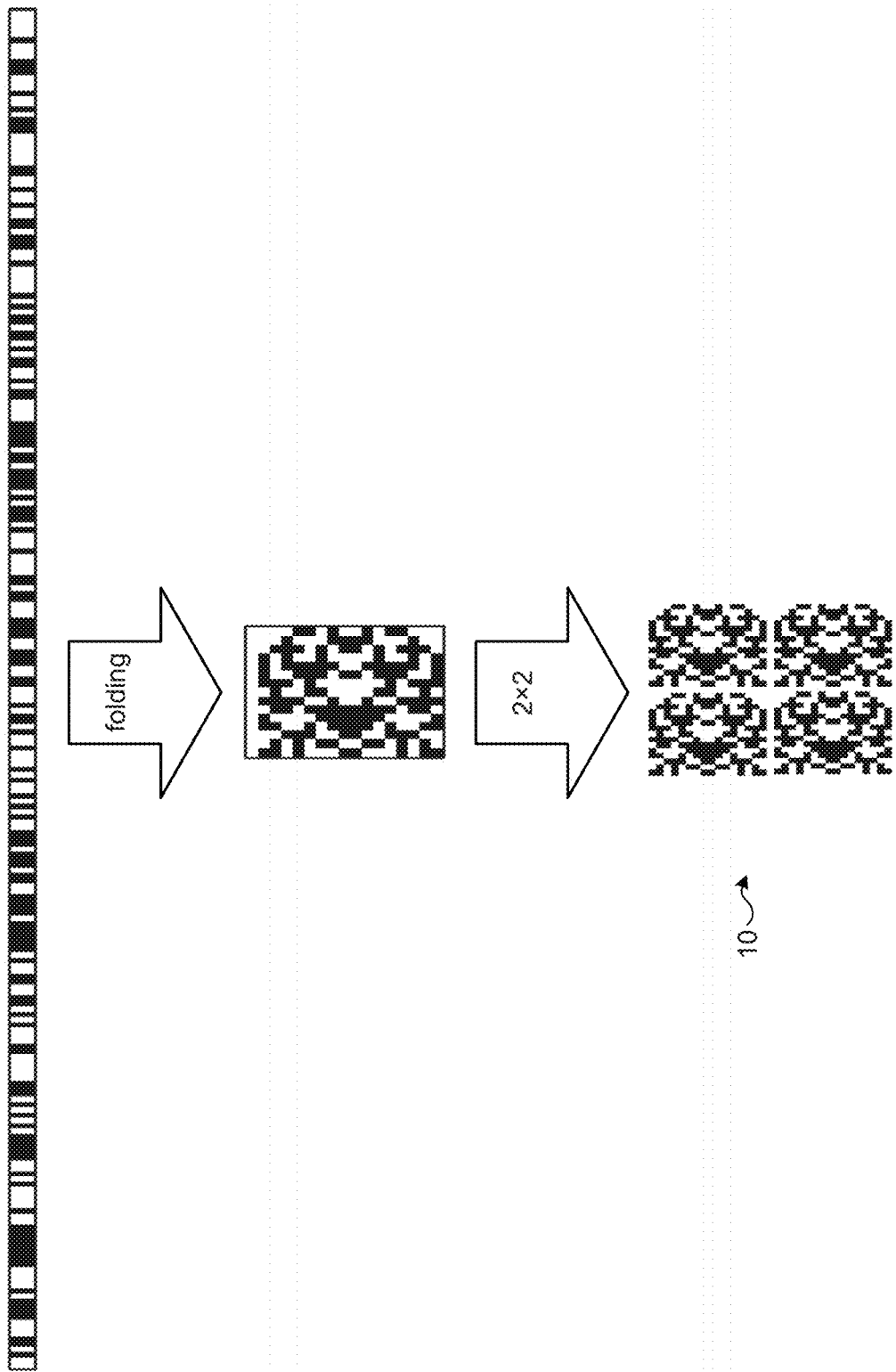
FIG. 3 is an explanatory diagram for explaining an example of a configuration of a binary mask 10 according to the prior art.

First, an optical element according to an embodiment of the present disclosure will be described with reference to FIGS. 2 and 3. FIG. 2 is an explanatory diagram for explaining an example of a configuration of an imaging device 100 according to the present embodiment, and FIG. 3 is an explanatory diagram for explaining an example of a configuration of a binary mask 10 according to the prior art.

Meanwhile, Non Patent Literature 5 described above discloses that a pattern of a binary mask used as an example of an optical element is obtained by folding a predetermined one-dimensional sequence on the basis of a predetermined rule so as to form a two-dimensional array. However, the binary mask disclosed in Non Patent Literature 5 is applied in a case where the aspect ratio of the scene and the aspect ratio of the image sensor are the same. Therefore, the present inventors have intensively studied and uniquely found that the binary mask 10 can be applied even if the aspect ratio of the scene and the aspect ratio of the image sensor 50 are mismatched by adding conditions described below. Hereinafter, details of the binary mask 10 according to the embodiment of the present disclosure created by the present inventors will be described.

As illustrated in FIG. 2, the binary mask (optical element) 10 according to the present embodiment is used by being superimposed on an image sensor (line sensor or area sensor) 50. In other words, as illustrated in FIG. 2, the imaging device 100 according to the present embodiment includes the image sensor 50 having one or more scanning lines (rows). (Specifically, one scanning line includes a plurality of pixels arranged along a row direction), and the binary mask 10 superimposed on the image sensor 50. Further, as illustrated in FIG. 2, the binary mask 10 includes a plurality of unit elements having substantially the same size as pixels 52 included in the image sensor 50, and each of the unit elements includes a light transmission filter 12 and a light non-transmission filter 14. More specifically, the binary mask 10 has a predetermined pattern including a plurality of the light transmission filters 12 and a plurality of the light non-transmission filters arranged in a two-dimensional lattice pattern. In other words, it can be said that the binary mask 10 is one type of optical element.

Furthermore, the autocorrelation function of a predetermined pattern repeated on the binary mask 10 has a sharp peak and has very small side lobes with respect to the peak. Since the above Formula can be solved by using such a binary mask 10, a captured image of an actual scene can be reconstructed from the observation data (signal) acquired by the image sensor 50.

Here, an outline of a method of generating a two-dimensional predetermined pattern of the prior art will be described with reference to FIG. 3. A one-dimensional sequence (one-dimensional pattern) illustrated in an upper part of FIG. 3 has a sharp peak and has very small side lobes with respect to the peak. More specifically, a length L of the one-dimensional sequence illustrated in the upper part of FIG. 3 is, for example, 255 when defined by the number of unit elements.

Next, the one-dimensional sequence (one-dimensional pattern) illustrated in the upper part of FIG. 3 is folded to generate a unit two-dimensional pattern illustrated in a middle part of FIG. 3. Here, when a size of the unit two-dimensional pattern is expressed by M×N when defined by the number of unit elements, the unit two-dimensional pattern is generated so as to satisfy a condition that the product (M×N) of M and N is equal to the length L of the one-dimensional sequence, and M and N are relatively prime. For example, the size of the unit two-dimensional pattern illustrated in the middle part of FIG. 3 is 15×17 when defined by the number of unit elements, that is, the condition that the product of M and N is equal to the length L 255 of the one-dimensional sequence, and M and N are relatively prime is satisfied Furthermore, by arranging the unit two-dimensional pattern as described above in 2×2, a two-dimensional predetermined pattern illustrated in a lower part of FIG. 3 can be obtained. Specifically, the size of the two-dimensional predetermined pattern illustrated in the lower part of FIG. 3 is (2M−1)×(2N−1), more specifically, 29×33 ((1.5×2−1)×(17×2−1) when defined by the number of unit elements.

For example, by using the binary mask 10 having the two-dimensional pattern illustrated in the lower part of FIG. 3, it is possible to project a flux of light from M×N points from a scene to be cyclically shifted on the image sensor 50 having a size of M×N defined by the number of pixels (unit pixels) 52. That is, the binary mask 10 having the two-dimensional pattern illustrated in the lower part of FIG. 3 can encode light from each point of M×N of the scene. In other words, the above formula (2) can be solved for X by using the binary mask 10 having the two-dimensional pattern illustrated in the lower part of FIG. 3. Then, the captured image of the actual scene can be reconstructed by applying an appropriate algorithm to the observation data (signal) based on the encoded light from each point of M×N of the scene.

However, the binary mask 10 having the two-dimensional pattern according to the prior art illustrated in the lower part of FIG. 3 described here is applied in a case where an aspect ratio of the scene is M:N and an aspect ratio of the image sensor 50 is also M:N, that is, the aspect ratios are the same. Therefore, in the present embodiment, as described above, by adding the conditions described below, the binary mask 10 is made applicable even if the aspect ratio of the scene and the aspect ratio of the image sensor 50 are mismatched <3.2 Method of Generating Two-Dimensional Pattern>

Figure 4:
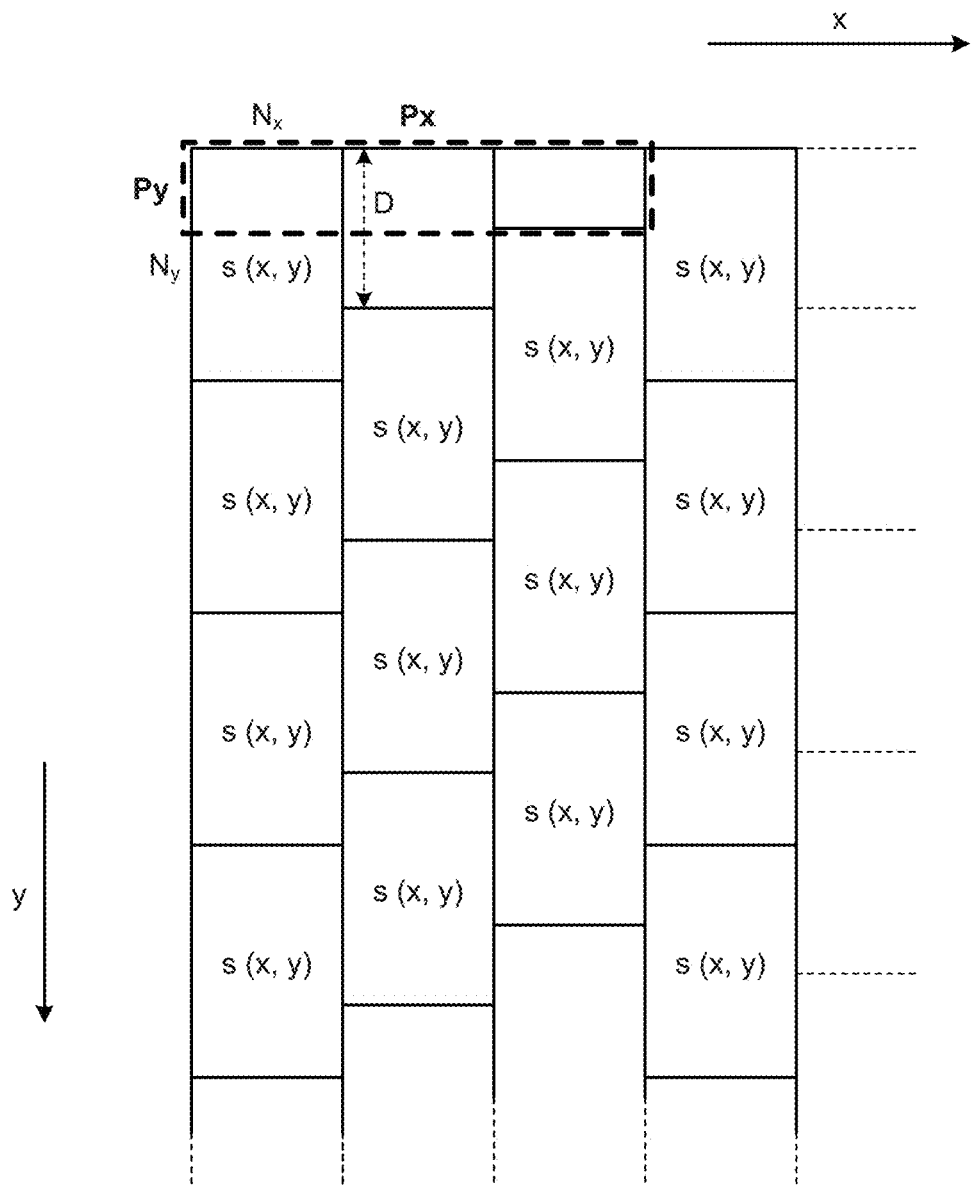
FIG. 4 is an explanatory diagram for explaining a method of generating a two-dimensional pattern according to an embodiment of the present disclosure.

Next, a method of generating a two-dimensional pattern of the binary mask 10 applicable even when the aspect ratio of the scene and the aspect ratio of the image sensor 50 are mismatched according to the present embodiment will be described with reference to FIG. 4. FIG. 4 is an explanatory diagram for explaining a method of generating a two-dimensional pattern according to the present embodiment.

Specifically, FIG. 4 illustrates a two-dimensional predetermined pattern to be generated. The two-dimensional predetermined pattern has a plurality of unit arrays s (x, y), and s (x, y) has a size of $N_x \times N_y$. It is assumed that $N_x \times N_y$ is also the size of the image sensor 50. Further, here, a resolution of the scene is $P_x \times P_y$, and the aspect ratio is $P_x : P_y$. Then, as illustrated in FIG. 4, in a case where a plurality of unit arrays s (x, y) are arranged so as to have displacement D along a Y-axis direction, a two-dimensional predetermined pattern including such a plurality of unit arrays s (x, y) can be expressed by the following formula (3).

$$\tilde{s}(x, y) = s\left(x \bmod N_x, y - D\left\lfloor \frac{x}{N_x} \right\rfloor \bmod N_y\right) \quad (3)$$

Then, on the basis of the above formula (3), an autocorrelation function of a predetermined pattern including a two-dimensional predetermined pattern including the plurality of unit arrays s (x, y) repeated while being periodically positionally displaced by the displacement D can be expressed by the following formula (4)

$$\tilde{\varphi}_{ss}(l, k) = \sum_{x=0}^{N_x-1} \sum_{y=0}^{N_y-1} s(x, y)\tilde{s}(x+l, y+k) \quad (4)$$

The side lobe of the autocorrelation function is defined by the following formula (5).

$$\tilde{Q}_{ss}(l,k) | 0 \leq l < a, 0 \leq k < b, (l,k) \neq (00) | \quad (5)$$

Therefore, by satisfying the following formula (6), the side lobe is ideally zero, that is, the side lobe is constant.

$$\tilde{Q}_{ss}(l,k)=0, f \text{ or } 0 \leq l < P_x, 0 \leq k < P_y, (l,k) \neq (00) \quad (6)$$

Here, a case where the unit array s (x, y) is expressed by the following formula (7) will be considered $$s(x, y) = s_0(n), \quad (7)$$

$$x = a_x n \bmod N_x,$$

$$y = a_y n - D\left\lfloor \frac{a_x n}{N_x} \right\rfloor \bmod N_y,$$

$$n = 0, 1, \ldots, N_x N_y - 1;$$

$$D = 0, 1, \ldots, N_y;$$

$$a_x = 1, 2, \ldots, N_x - 1;$$

$$a_y = 0, 1, \ldots, N_y - 1$$

In such a case, when the following formula (8) is satisfied, the following formula (9) holds.

$$gcd(a_x, N_x)=$$

$$gcd(|a_y \cdot N_x - Da_x|, N_y)=1 \quad (8)$$

$$\tilde{Q}_{ss}(l,k) = \tilde{Q}_{s_0 s_0}(m) \quad (9)$$

That is, according to the above formula (9), it is indicated that the autocorrelation function of the unit array s (x, y) is maintained even in a two-dimensional predetermined pattern. In other words, in a case where the two-dimensional predetermined pattern is generated so as to satisfy the above formula (8), the autocorrelation function of the unit array s (x, y) is maintained even in the two-dimensional predetermined pattern. Here, in deriving the formula (9), the above formula (7) is used assuming that $0 \leq l$ (el)$<N_x$ and $0 \leq k < N_y$ are satisfied. That is, as can be seen from the above formula (6), here, the aspect ratio of the scene and the aspect ratio of the image sensor 50 are assumed to be the same.

However, in the present embodiment, it is assumed that the aspect ratio of the scene and the aspect ratio of the image sensor 50 are mismatched Therefore, here, in a case where the aspect ratio of the scene is $P_x : P_y$, $N_x \times N_y = P_x \times P_y$ (In other words, the image sensor 50 has the same number of pixels 52 as a resolution for the scene.), and a condition of $N_x \neq P_x$ are satisfied In such a case, l(el) and k may be positioned outside the ranges of $0 \leq l(el) < N_x$ and $0 \leq k < N_y$. That is, it is not possible to use the condition that $0 \leq l$ (el)$<N_x$ and $0 \leq k < N_y$ are satisfied, which are used for deriving the formula (9).

Therefore, in the present embodiment, even if the aspect ratio of the scene and the aspect ratio of the image sensor 50 are mismatched, the autocorrelation function has a sharp peak and has very small side lobes with respect to the peak, and in order to make the side lobes substantially constant (desirably constant), a two-dimensional predetermined pattern is generated under conditions that satisfy the following formula (10) and the above formulas (7) and (8).

$$P_x = MN_x$$

$$P_y = N_y/M$$

$$D = \alpha P_y$$

$$gcd(\alpha, M) = 1 \quad (10)$$

That is, in the present embodiment, it is possible to generate a two-dimensional predetermined pattern having an autocorrelation function as described above by folding a one-dimensional sequence (one-dimensional pattern) having the autocorrelation function as described above on the basis of a predetermined rule to which the above formula (10) and the above formulas (7) and (8) are added. Then, according to the binary mask 10 having such a two-dimensional predetermined pattern, the above formula (2) can be efficiently and robustly solved for X. As a result, according to the embodiment of the present disclosure, even if the aspect ratio of the scene and the aspect ratio of the image sensor 50 are mismatched, it is possible to avoid deterioration in quality of the captured image of the reconstructed actual scene.

<3.3 Mismatch Between Aspect Ratio of Scene and Aspect Ratio of Image Sensor>

Figure 5:
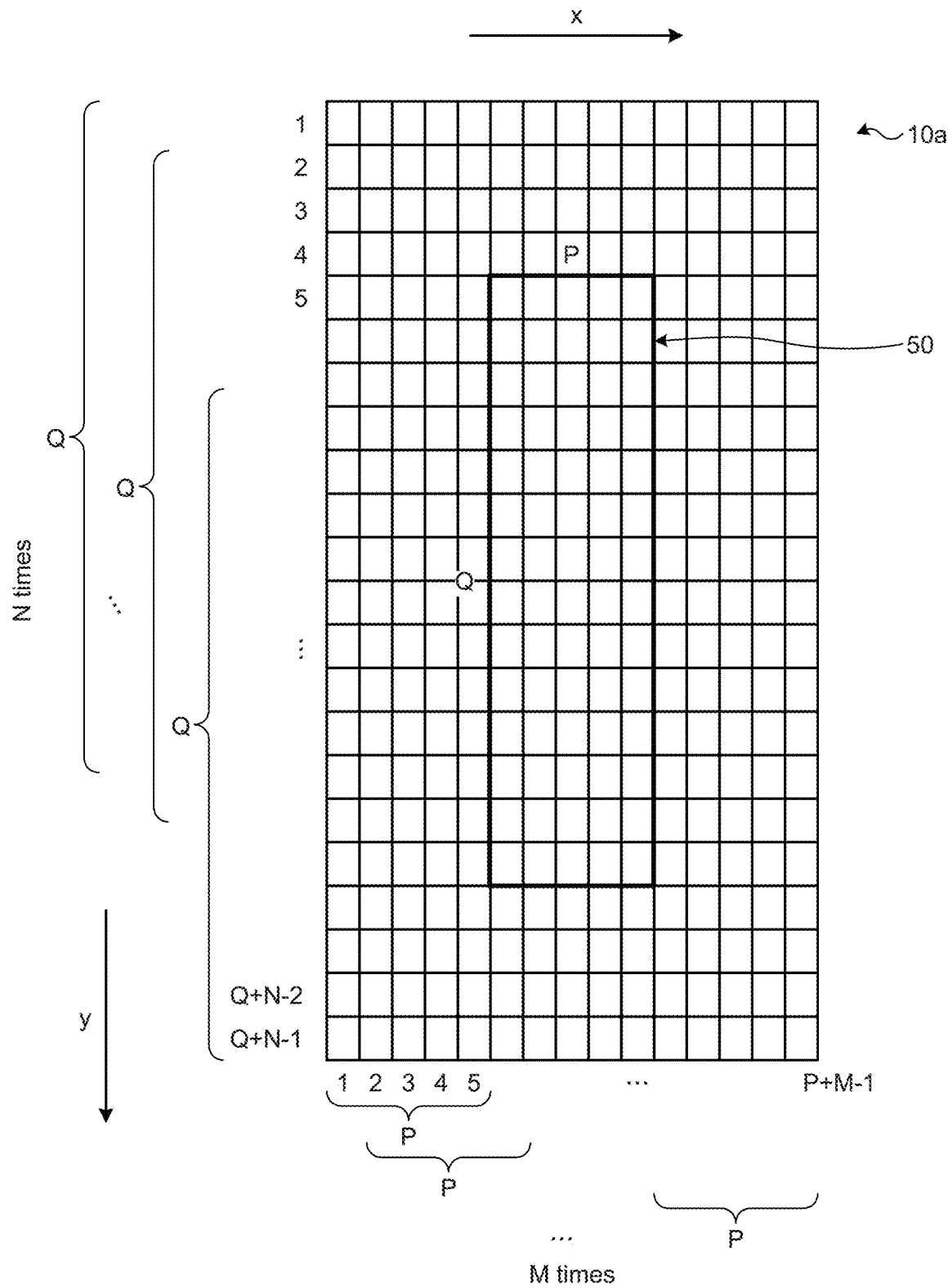
FIG. 5 is an explanatory diagram (part 1) for explaining an embodiment of the present disclosure

Next, the use in a case where the aspect ratio of the scene and the aspect ratio of the image sensor 50 are mismatched according to the present embodiment will be described in more detail with reference to FIG. 5. FIG. 5 is an explanatory diagram for describing the present embodiment, and specifically illustrates an example of a binary mask 10*a* according to the present embodiment.

Here, it is considered that light from each of M×N points of the scene is encoded and projected on a rectangular image sensor 50 having a size of P×Q when defined by the number of pixels 52 (That is, the resolution for the scene is M×N). In this case, a size of the binary mask 10*a* is (P+M−1)×(Q+N−1) when defined by the number of unit elements. That is, as illustrated in FIG. 5, the size of the binary mask 10*a* has a size obtained by translating the image sensor 50 M times per column per unit element along an X direction and N times per row per unit element along a Y direction. Here, it is assumed that a condition that M×P=Q is satisfied, M and N are relatively prime, and P and Q are relatively prime is satisfied.

In principle, if the binary mask 10 is a uniform redundant array mask, it is possible o encode and project light from each of the M×N points of the scene on the image sensor 50 having a size of P×Q. However, if the binary mask 10 is merely a uniform redundant array mask, in a case where the aspect ratio of the scene and the aspect ratio of the image sensor 50 are mismatched, since the uniform redundant array mask merely includes periodic repetition, it is difficult to accurately encode and project light from each of the M×N points of the scene. That is, in a case where the binary mask 10 is merely a uniform redundant array mask, it is difficult to avoid deterioration in quality of a captured image of a reconstructed actual scene.

Therefore, in the present embodiment, as described above, the binary mask 10a having a predetermined pattern in which the autocorrelation function has a sharp peak, has very small side lobes with respect to the peak, and further, the side lobes are substantially constant (desirably constant) is used. As a result, according to the present embodiment, even if the aspect ratio of the scene and the aspect ratio of the image sensor 50 are mismatched, it is possible to accurately encode and project the light from each of the M×N points of the scene on the image sensor 50. In other words, according to the present embodiment, the above formula (2) can be obtained efficiently and robustly. Therefore, according to the present embodiment, it is possible to avoid deterioration in quality of the reconstructed captured image of the actual scene.

<3.4 Example of Binary Mask 10>

Figure 6:
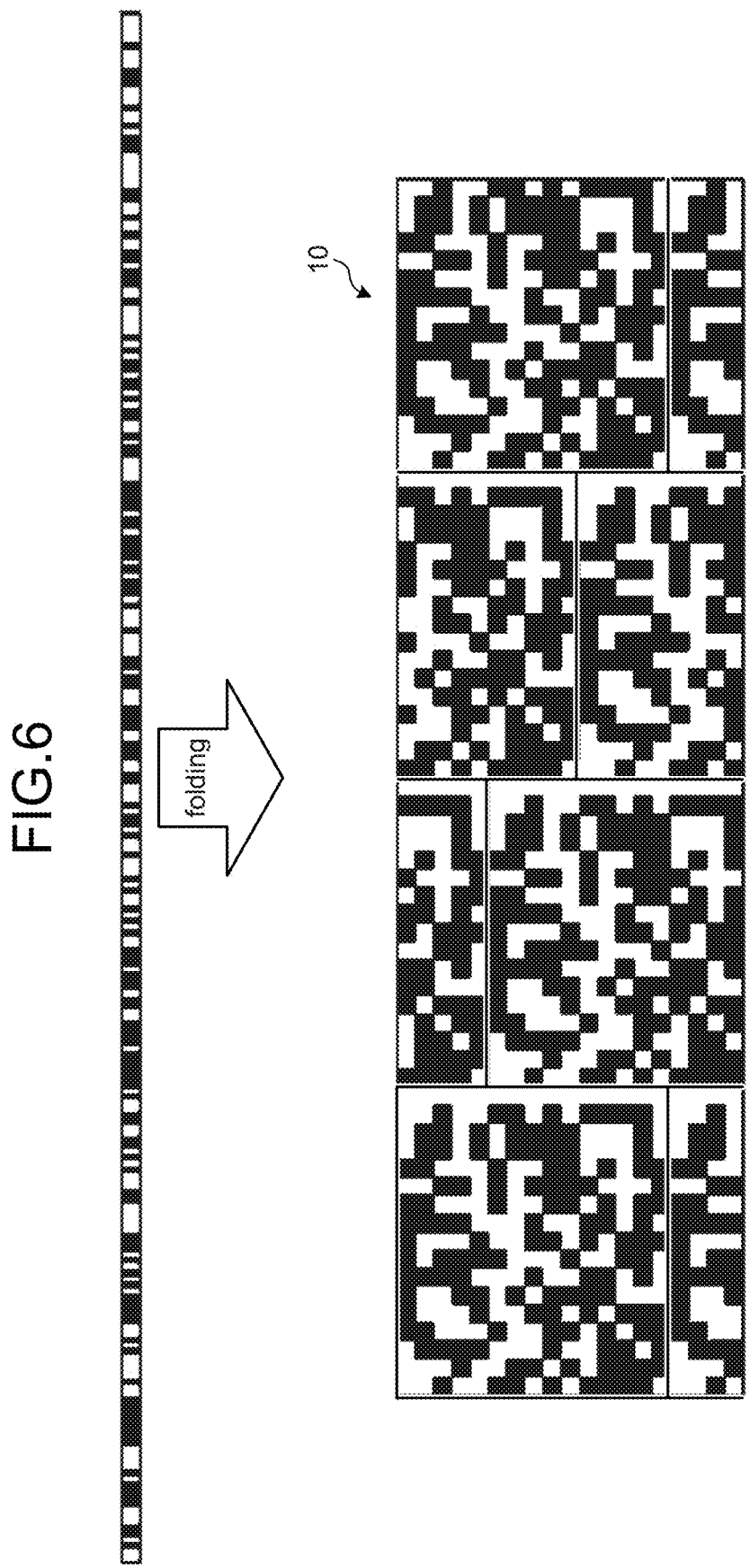
FIG. 6 is an explanatory diagram (part 1) for explaining a method of generating a binary mask 10 according to the present embodiment.

Next, an example of the binary mask 10 applicable even when the aspect ratio of the scene and the aspect ratio of the image sensor 50 are mismatched according to the present embodiment will be described with reference to FIG. 6. FIG. 6 is an explanatory diagram for describing a method of generating the binary mask 10 according to the present embodiment.

Here, it is considered to encode and project light from each of the M×N=51×5 points of the scene on the rectangular image sensor 50 having a size of P×Q=17×15 when defined by the number of pixels 52 (That is, the resolution with respect to the scene is M×N=51×5.). In the above condition, M×N=P×Q=51×5=17×15=255, and the condition that M and N are relatively prime and P and Q are relatively prime is satisfied Then, in this case, as described above, the size of the binary mask 10 is required to be (P+M−1)×(Q+N−1)=(17+51−1)×(15+5−1)=67×19 when defined by the number of unit elements.

Specifically, in the present embodiment, a two-dimensional predetermined pattern is generated by folding a one-dimensional sequence (one-dimensional pattern) having a length L=255 illustrated in the upper part of FIG. 6 on the basis of a predetermined rule. In the present embodiment, the conditions $a_x=1$, $a_y=2$, D=5, $\alpha=1$, and M=5 are used as the parameters $a_x$, $a_y$, D, $\alpha$, and M that satisfy the formulas (6), (8), and (10). In this way, in the present embodiment, the binary mask 10 having the two-dimensional predetermined pattern illustrated in a lower part of FIG. 6 can be obtained. The predetermined pattern of the binary mask 10 illustrated in the lower part of FIG. 6 has a plurality of unit arrays s (67×19) repeated while being periodically positionally displaced by the displacement D.

By doing so, in the present embodiment, even if the aspect ratio of the scene and the aspect ratio of the image sensor 50 are mismatched, it is possible to obtain the binary mask 10 in which the autocorrelation function has a sharp peak, has very small side lobes with respect to the peak, and has a two-dimensional predetermined pattern in which the side lobes are substantially constant (desirably constant).

<3.5 Another Example of Binary Mask 10>

Figure 7:
FIG. 7 is an explanatory diagram (part 2) for explaining the method of generating the binary mask 10 according to the present embodiment.

Next, an example of the binary mask 10 applicable to the rolling shutter system (details of the rolling shutter system will be described later) will be described FIG. 7 is an explanatory diagram for describing a method of generating the binary mask 10 according to the present embodiment.

Here, a case where a two-dimensional image sensor 50 (That is, the scanning line has 60 rows.) having 60×85 pixels 52 is used and a resolution with respect to the scene is set to 15×17 is considered. Furthermore, in the present embodiment, in the imaging by the rolling shutter system, observation data (signal) is acquired for each scanning line group including three rows of scanning lines on the image sensor 50. That is, the image sensor 50 is divided into 20. Note that, in the above condition, M×N×P×Q=3×85=15×17=255, and the condition that M and N are relatively prime and P and Q are relatively prime is satisfied.

Specifically, in the present embodiment, a two-dimensional predetermined pattern is generated by folding a one-dimensional sequence (one-dimensional pattern) having a length L=255 illustrated in the upper part of FIG. 6 on the basis of a predetermined rule. In the present embodiment, a condition of $a_x=1$, $a_y=1$, and D=17 is used as the parameters $a_x$, $a_y$, and D satisfying the formulas (6), (8), and (10). In this way, in the present embodiment, the binary mask 10 having the two-dimensional predetermined pattern illustrated in FIG. 7 can be obtained. Specifically, the predetermined pattern of the region corresponding to the scanning line group of the binary mask 10 illustrated in FIG. 7 has a size of (15+3−1)×(17+18−1) when defined by the number of unit elements. Furthermore, in order to cover the resolution for 60 rows, by repeating sections having a predetermined pattern having a size of {15+3−1+(60−3))}×(17+85−1)=74×101 while being periodically positionally displaced by the displacement D, it is possible to obtain the binary mask 10 having the two-dimensional predetermined pattern illustrated in FIG. 7. That is, each of the sections of 74×101 size on the binary mask 10 can be simultaneously used as a binary mask for each of the 20 divided areas of the image sensor 50.

By doing so, in the present embodiment, it is possible to obtain the binary mask 10 which is applicable to the rolling shutter system and has a two-dimensional predetermined pattern in which not only the autocorrelation function has a sharp peak and has very small side lobes with respect to the peak, but also the side lobes are substantially constant (desirably constant).

<3.6 Imaging of One-Dimensional Scene by Two-Dimensional Image Sensor (Area Sensor)>

Figure 8:
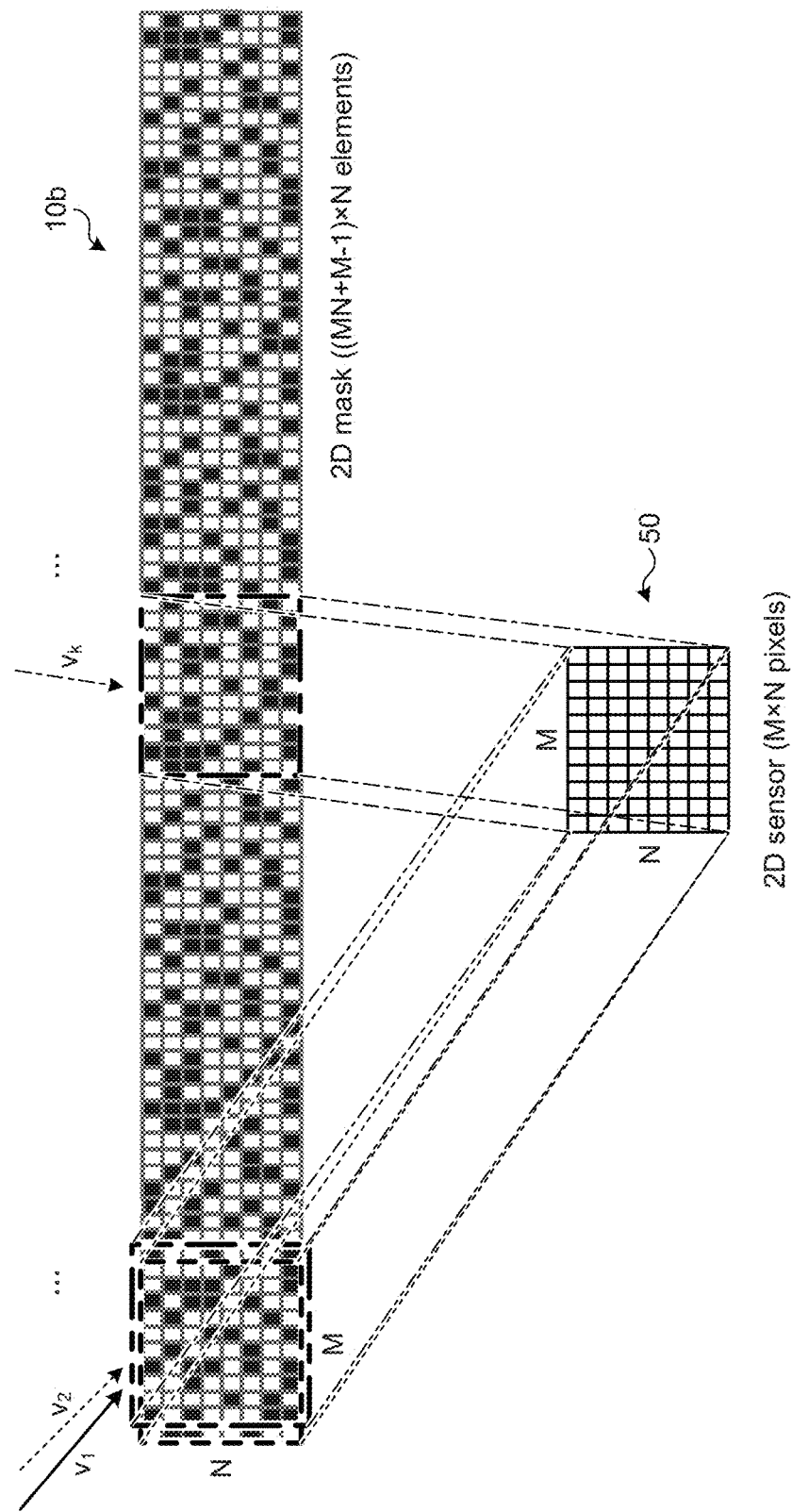
FIG. 8 is an explanatory diagram (part 2) for explaining the embodiment of the present disclosure.
Figure 9:
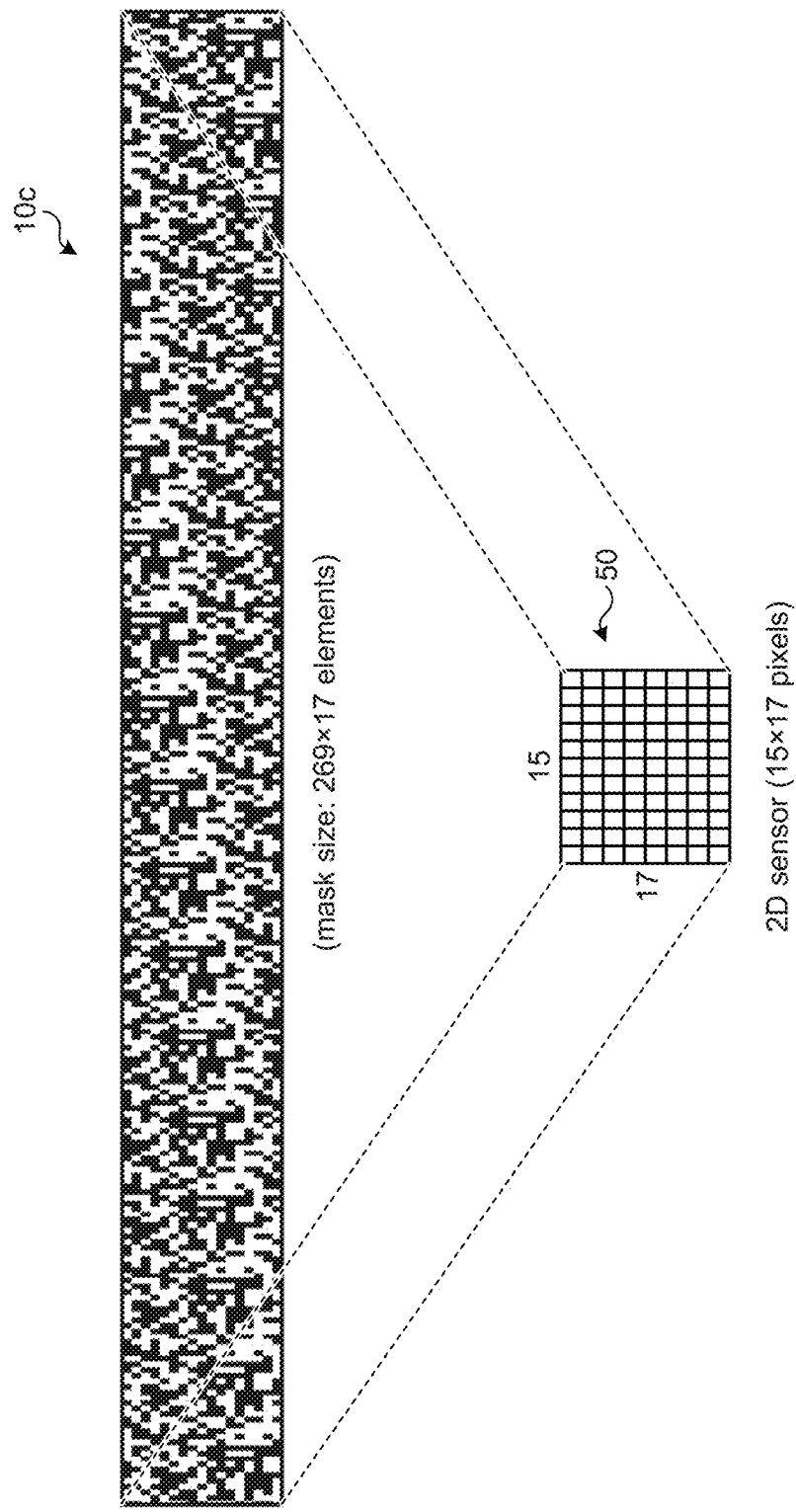
FIG. 9 is an explanatory diagram (part 3) for explaining the embodiment of the present disclosure.

Furthermore, specifically, imaging of a one-dimensional scene using the two-dimensional image sensor 50 according to the present embodiment will be described with reference to FIGS. 8 and 9. FIGS. 8 and 9 are explanatory diagrams for explaining the present embodiment, and specifically, are explanatory diagrams for explaining imaging of a one scene using the two-dimensional image sensor 50 according to the present embodiment. Note that, in the following description, it is assumed that the image sensor 50 has a size of M×N when defined by the number of pixels 52, and the size of the scene is MN×1 (one-dimensional) (That is, the resolution of the scene is MN×1).

Here, in the present embodiment, the imaging device 100 includes a binary mask 10b having a size of (MN+M−1)×N when defined by the number of unit elements illustrated in FIG. 8, and a two-dimensional image sensor (area sensor) 50 having a size of M×N when defined by the number of pixels 52. Then, in the present embodiment, each of the MN points of the scene is arranged in one line (In detail, for example, along a horizontal direction) on one plane (That is, a one-dimensional scene), and light ($V_1, V_2, \ldots, V_k, \ldots, V_{MN}$) from each of the MN points passes through the binary mask 10b and is projected on the image sensor 50 as illustrated in FIG. 8. Then, each of the light ($V_1, V_2, \ldots, V_k, \ldots, V_{MN}$) is encoded by a pattern of each region having a corresponding N×N size on the binary mask 10b.

As described above, the predetermined pattern of the binary mask 10b according to the present embodiment has a sharp peak, has very small side lobes with respect to the peak, and has an autocorrelation function in which the side lobes are substantially constant (desirably, constant) Therefore, the binary mask 10b can encode and project light from each of the MN points of the scene with high accuracy. In other words, according to the present embodiment, the above formula (2) can be efficiently and robustly obtained for X. Therefore, according to the present embodiment, even in the imaging of the one-dimensional scene using the two-dimensional image sensor 50, it is possible to avoid deterioration in quality of the reconstructed captured image of the actual scene.

Further, a more specific example will be described with reference to FIG. 9. In the example of FIG, 9, a two-dimensional image sensor 50 having a size of M×N=15×17 defined by the number of pixels 52 is used In this case, in the present embodiment, a one-dimensional sequence (one-dimensional pattern) having a length L=255 illustrated in the upper part of FIG. 3 is folded to generate the two-dimensional predetermined pattern. In the example of FIG. 9, a resolution ($P_x \times P_y$) of the scene is 255×1, and the size ($N_x \times N_y$) of the image sensor 50 is 15×17. Therefore, when the two-dimensional predetermined pattern is generated, conditions of $a_x=1$, $a_y=0$, and D=1 are used as the parameters $a_x$, $a_y$, and D (see the formula (7)) satisfying the above formulas (6), (8), and (10) described above. For example, the predetermined pattern of the binary mask 10b illustrated in FIG. 9 is generated as a plurality of unit arrays s (x, y) included in a broken-line rectangle illustrated in the upper left of FIG. 4 and repeated while being periodically positionally displaced by the displacement D. Specifically, the binary mask 10c has a size of 269×17 when defined by the number of unit elements.

As described above, the predetermined pattern of the binary mask 10c illustrated in FIG. 9 that satisfies the formulas (6), (8), and (10) has an autocorrelation function that has a sharp peak, has very small side lobes with respect to the peak, and has substantially constant side lobes (desirably, constant). Therefore, the binary mask 10c can accurately encode and project light from each of 255×1 points of the scene. Therefore, according to the present embodiment, even in the imaging of the one-dimensional scene (255×1) using the two-dimensional image sensor 50, it is possible to avoid deterioration in quality of the reconstructed captured image of the actual scene.

<3.7 Imaging of Two-Dimensional Scene by One-Dimensional Image Sensor (Line Sensor).

Figure 10:
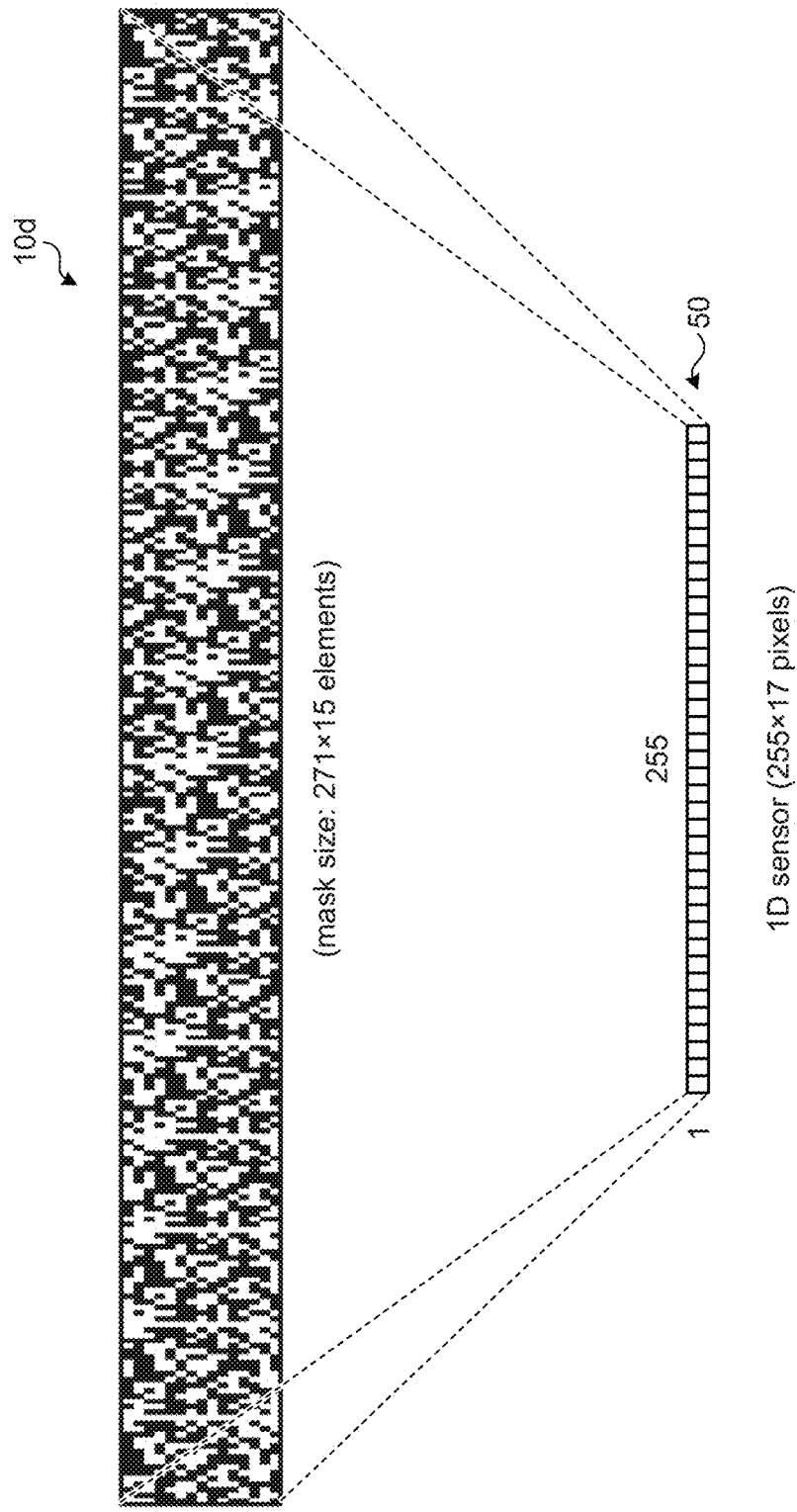
FIG. 10 is an explanatory diagram (part 4) for explaining the embodiment of the present disclosure.

Furthermore, specifically, imaging of a two-dimensional scene using the one-dimensional image sensor (line sensor) 50 according to the present embodiment will be described with reference to FIG. 10. FIG. 10 is an explanatory diagram for describing the present embodiment, and specifically, is an explanatory diagram for describing imaging of a two-dimensional scene using the one-dimensional image sensor 50 according to the present embodiment. Note that, in the following description, it is assumed that the image sensor 50 has a size of MN×1 when defined by the number of pixels 52, and the size of the scene is M×N (two-dimensional).

More specifically, in the example of FIG. 10, a one-dimensional image sensor 50 having a size of 255×1 defined by the number of pixels 52 is used In this case, in the present embodiment, a one-dimensional sequence (one-dimensional pattern) having a length L=255 illustrated in the upper part of FIG. 3 is folded to generate the two-dimensional predetermined pattern. In the example of FIG. 10, the resolution ($P_x \times P_y$) of the scene is 15×17, and the size ($N_x \times N_y$) of the image sensor 50 is 255×1. Therefore, when the two-dimensional predetermined pattern is generated, conditions of $a_x=1$, $a_y=1$, D=17, and $\alpha=1$ are used as the parameters $a_x$, $a_y$, D (see the formula (7)), and a (see the formula (10)) satisfying the formulas (6), (8), and (10). For example, the predetermined pattern of a binary mask 10d illustrated in FIG. 10 has a size of 271×15 when defined by the number of unit elements.

As described above, the predetermined pattern of the binary mask 10d illustrated in FIG. 10 that satisfies the formulas (6), (8), and (10) has an autocorrelation function that has a sharp peak, has very small side lobes with respect to the peak, and has substantially constant side lobes (desirably, constant). Therefore, the binary mask 10d can accurately encode and project light from each of 15×1.7 points of the scene. Therefore, according to the present embodiment, even in the imaging of the two-dimensional scene (15×17) using the one-dimensional image sensor 50, it is possible to avoid deterioration in quality of the reconstructed captured image of the actual scene.

<3.8 Imaging of Two-Dimensional Scene by Two-Dimensional Image Sensor (Area Sensor)>

Figure 11:
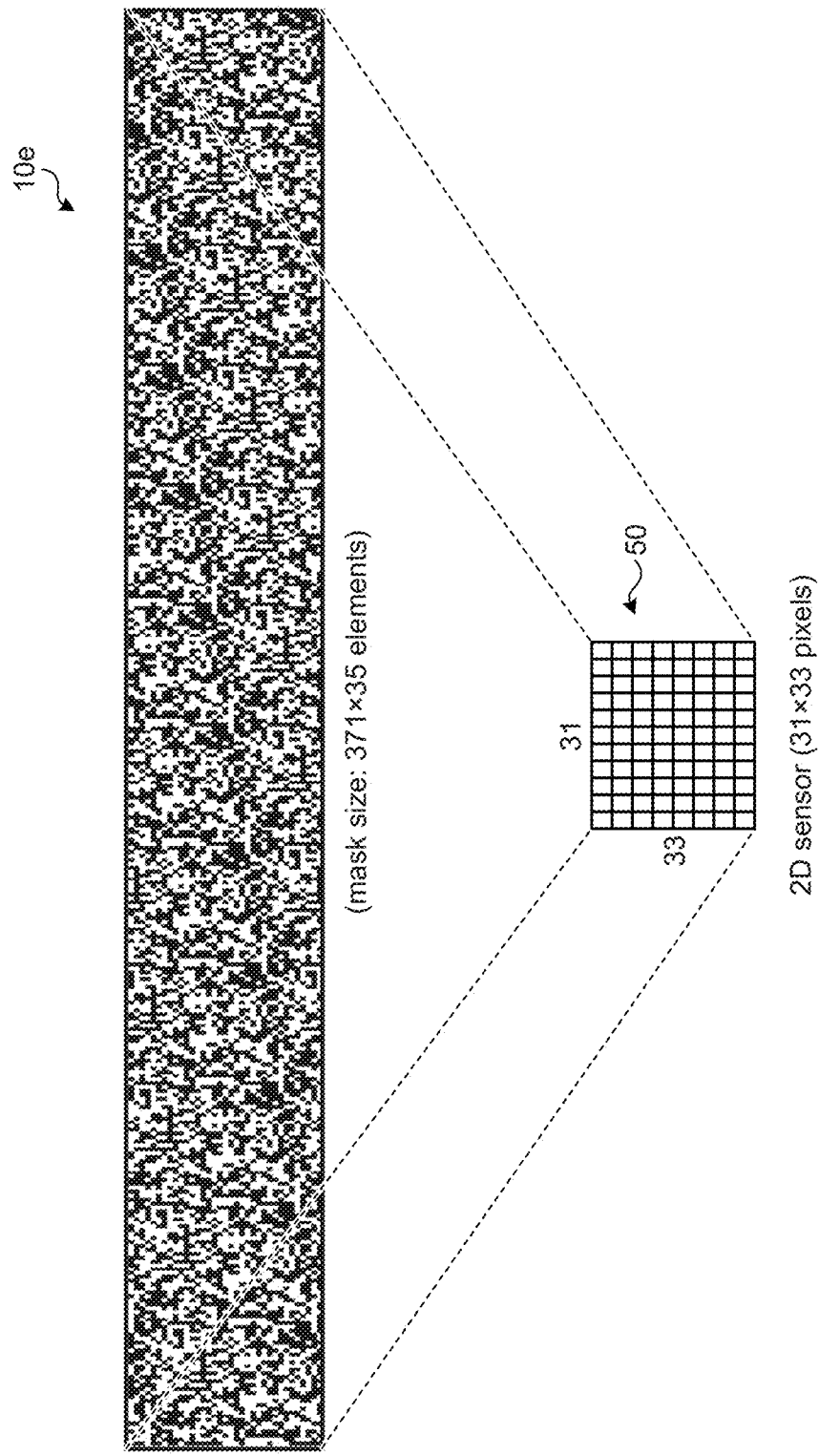
FIG. 11 is an explanatory diagram (part 5) for explaining the embodiment of the present disclosure.

Furthermore, specifically, imaging of a two-dimensional scene using the two-dimensional image sensor (area sensor) 50 according to the present embodiment will be described with reference to FIG. 11. FIG. 11 is an explanatory diagram for describing the present embodiment, and specifically, is an explanatory diagram for describing imaging of a two-dimensional scene using the two-dimensional image sensor 50 according to the present embodiment. Note that, in the following description, it is assumed that the image sensor 50 has a size of M×N when defined by the number of pixels 52, and the size of the scene is P×Q (two dimensions). In addition, here, it is assumed that M×N=P×Q, and the condition that M and N are relatively prime and P and Q are relatively prime is satisfied.

More specifically, in the example of FIG. 11, a two-dimensional image sensor 50 having a size of 31×33 defined by the number of pixels 52 is used in this case, in the present embodiment, a two-dimensional predetermined pattern is generated by folding a one-dimensional sequence (one-dimensional pattern) having a length L=1023. In the example of FIG. 11, the resolution ($P_x \times P_y$) of the scene is 341×3, and the size ($N_x \times N_y$) of the image sensor 50 is 31×33. Therefore, when the two-dimensional predetermined pattern is generated, conditions of $a_x=1$, $a_y=1$, D=37, and $\alpha=1$ are used as the parameters $a_x$, $a_y$, D (see the formula (7)), and α (see the formula (10)) satisfying the formulas (6), (8), and (10), For example, a predetermined pattern of a binary mask 10e illustrated in FIG. 11 has a size of 371×35 when defined by the number of unit elements.

As described above, the predetermined pattern of the binary mask 10e illustrated in FIG. 11 that satisfies the formulas (6), (8), and (10) has an autocorrelation function that has a sharp peak, has very small side lobes with respect to the peak, and has substantially constant side lobes (desirably, constant). Therefore, the binary mask 10e can accurately encode and project light from each of 341×3 points of the scene. Therefore, according to the present embodiment, even if the aspect ratio of the scene and the aspect ratio of the image sensor 50 are mismatched, it is possible to avoid deterioration. In quality of the reconstructed captured image of the actual scene in imaging of the two-dimensional scene using the two-dimensional image sensor 50.

<3.9 Rolling Shutter System>

(Basic Principle)

Figure 12:
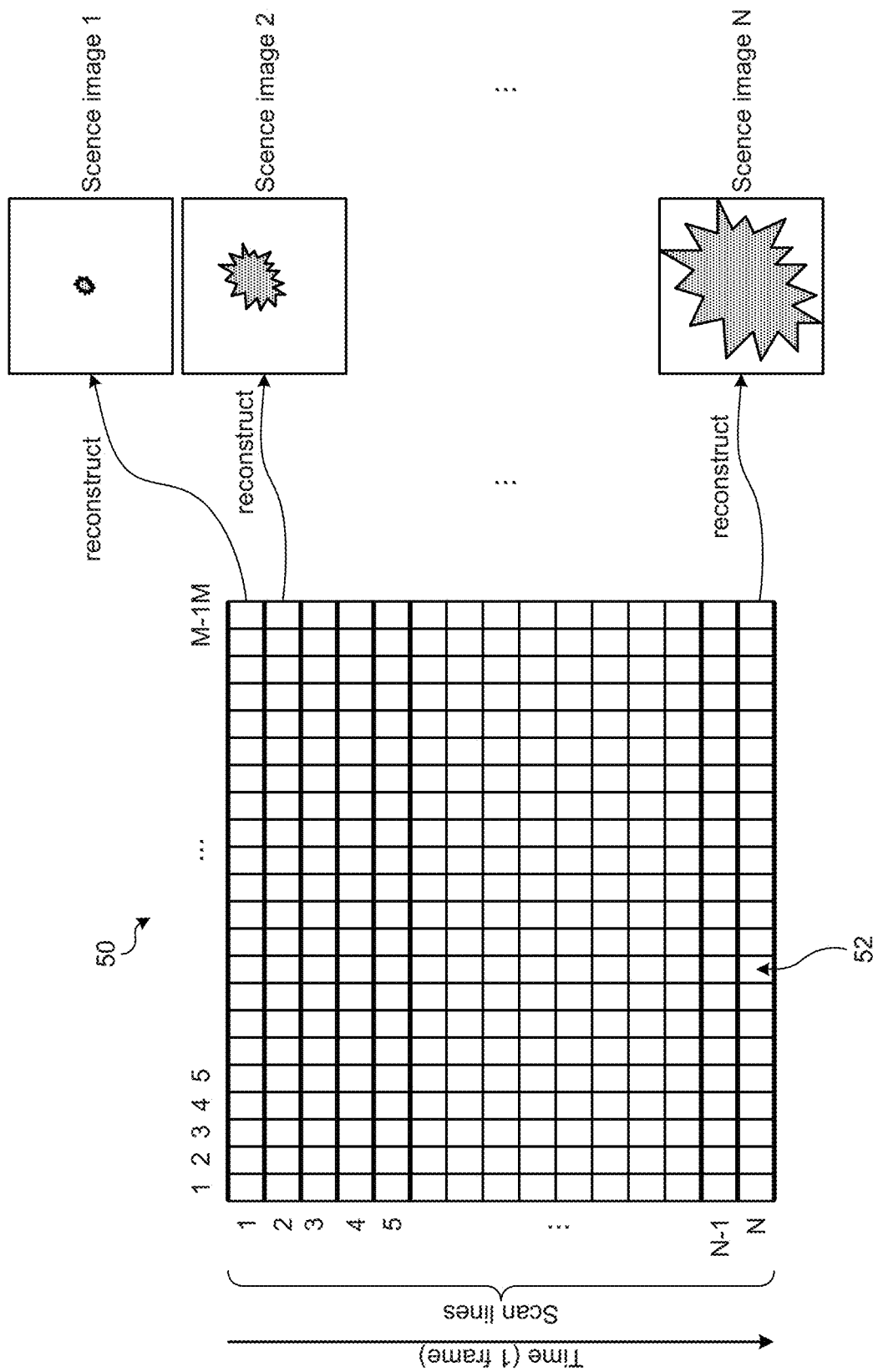
FIG. 12 is an explanatory diagram (part 1) for explaining a rolling shutter system according to an embodiment of the present disclosure.

Next, an example in which the present embodiment is applied to a rolling shutter system will be described The basic principle of the rolling shutter system will be described below with reference to FIG. 12. FIG. 12 is an explanatory diagram for explaining a rolling shutter system in the present embodiment.

In the rolling shutter system, unlike a global shutter system, the imaging device 100 operates to sequentially acquire observation data (signals) for each scanning line (row) including the plurality of pixels 52 on the image sensor 50. On the other hand, in the global shutter system, the imaging device 100 operates to acquire observation data (signal) simultaneously in all the scanning lines (rows) on the image sensor 50, in other words, simultaneously in all the pixels 52 on the image sensor 50.

Here, a case will be considered in which the imaging device 100 including the image sensor 50 having N rows or scanning lines as illustrated in FIG. 12 operates to acquire observation data (signal) sequentially for each rolling shutter system, specifically, for each scanning line of one row. In this case, the imaging device 100 acquires N pieces of observation data (signals) by performing imaging once, and can reconstruct N captured images from the acquired N pieces of observation data as illustrated on the right side of FIG. 12. That is, according to the rolling shutter system, since N captured images can be reconstructed by one imaging, for example, the frame rate can be increased from F(fps) to FN (fps).

Present Embodiment

Figure 13:
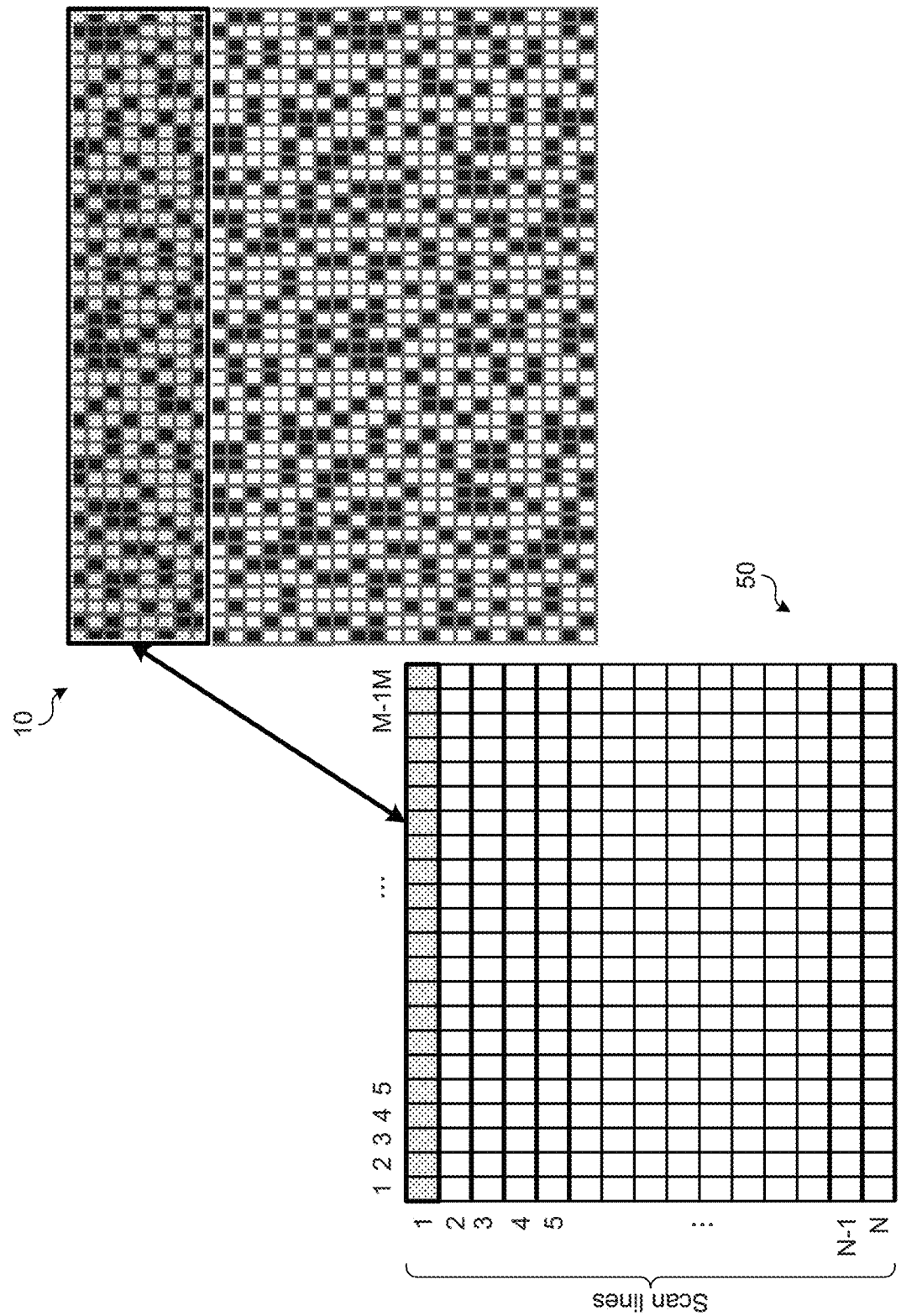
FIG. 13 is an explanatory diagram (part 2) for explaining the rolling shutter system according to the embodiment of the present disclosure.
Figure 14:
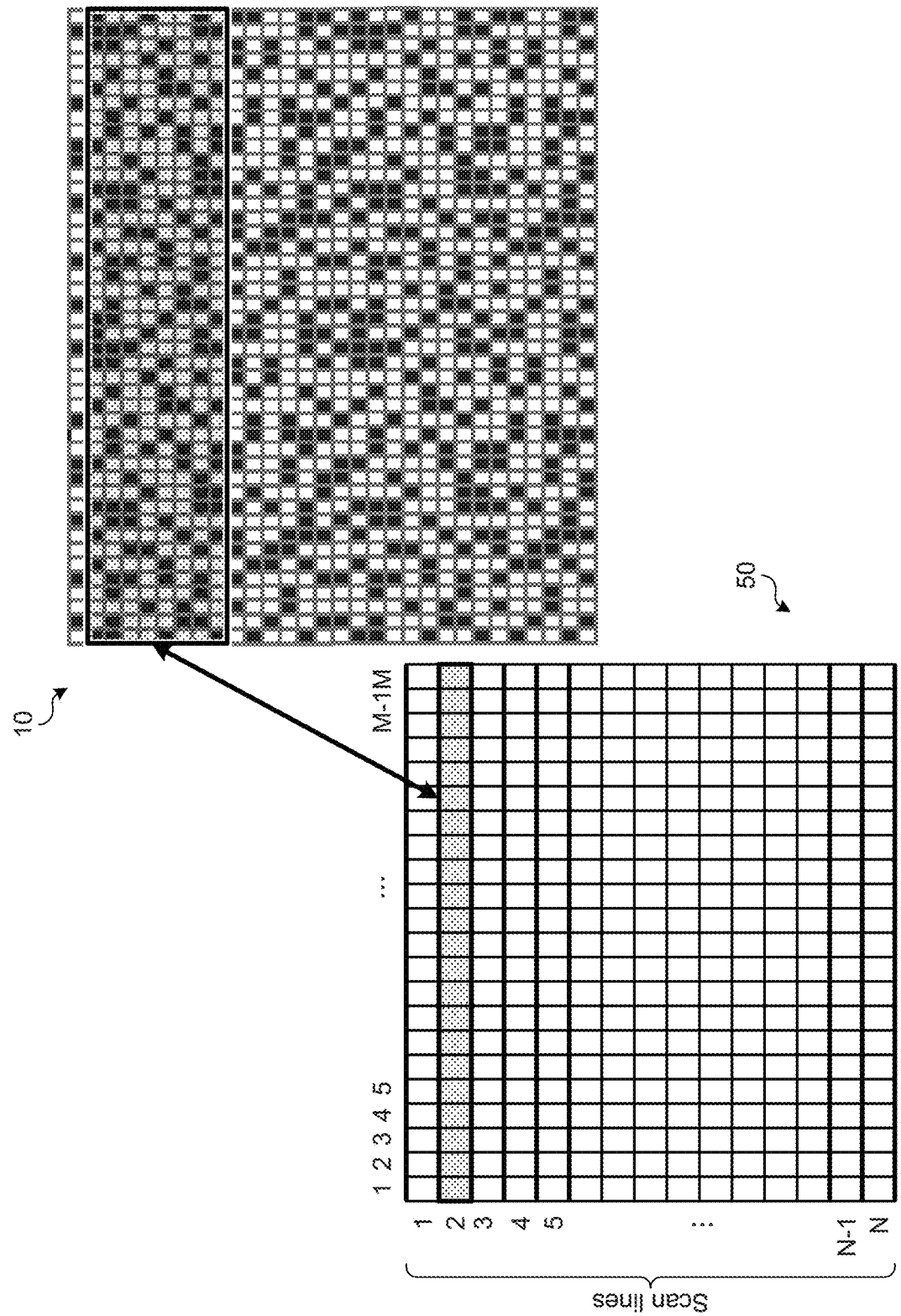
FIG. 14 is an explanatory diagram (part 3) for explaining the rolling shutter system according to the embodiment of the present disclosure.
Figure 15:
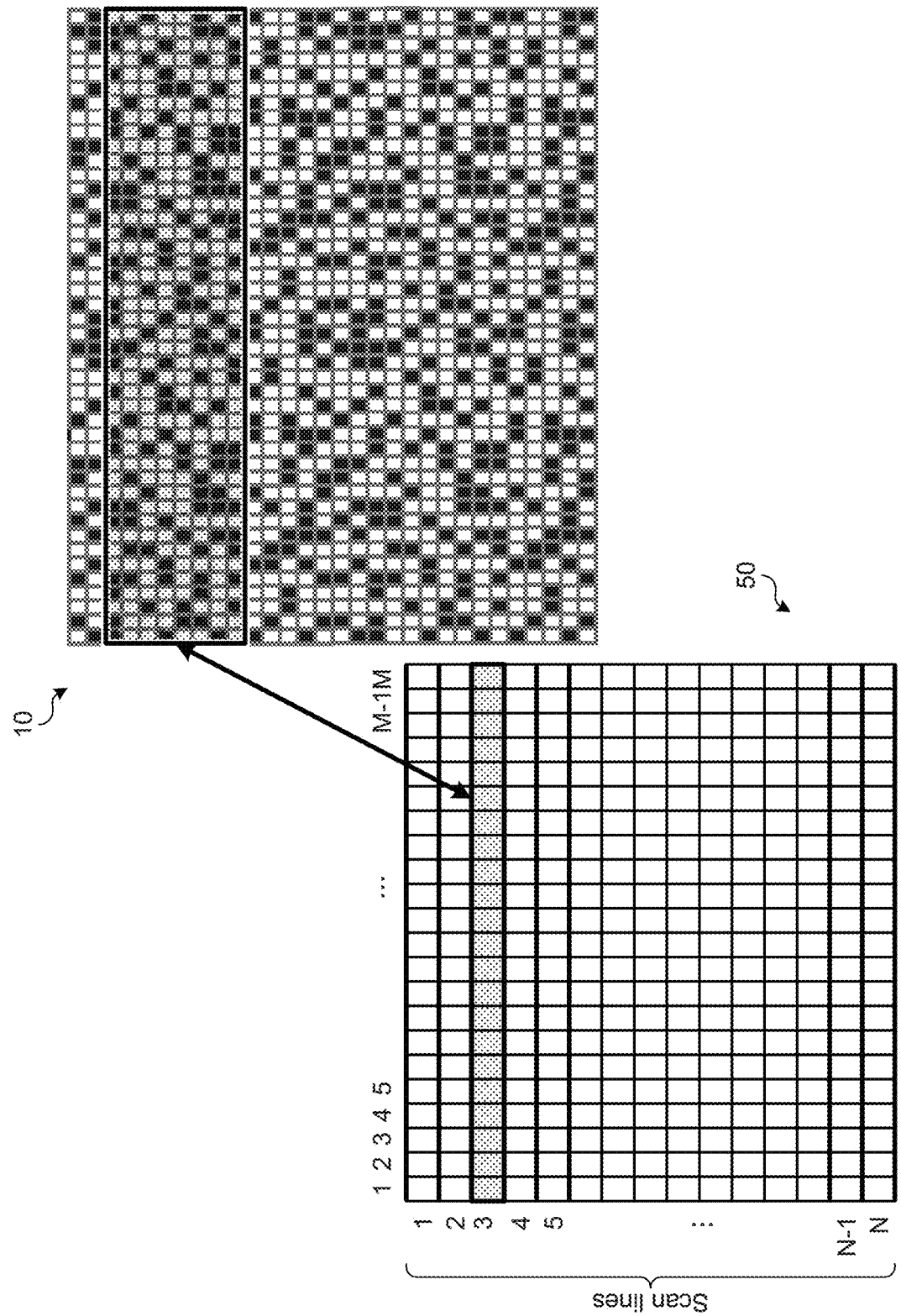
FIG. 15 is an explanatory diagram (part 4) for explaining the rolling shutter system according to the embodiment of the present disclosure.
Figure 16:
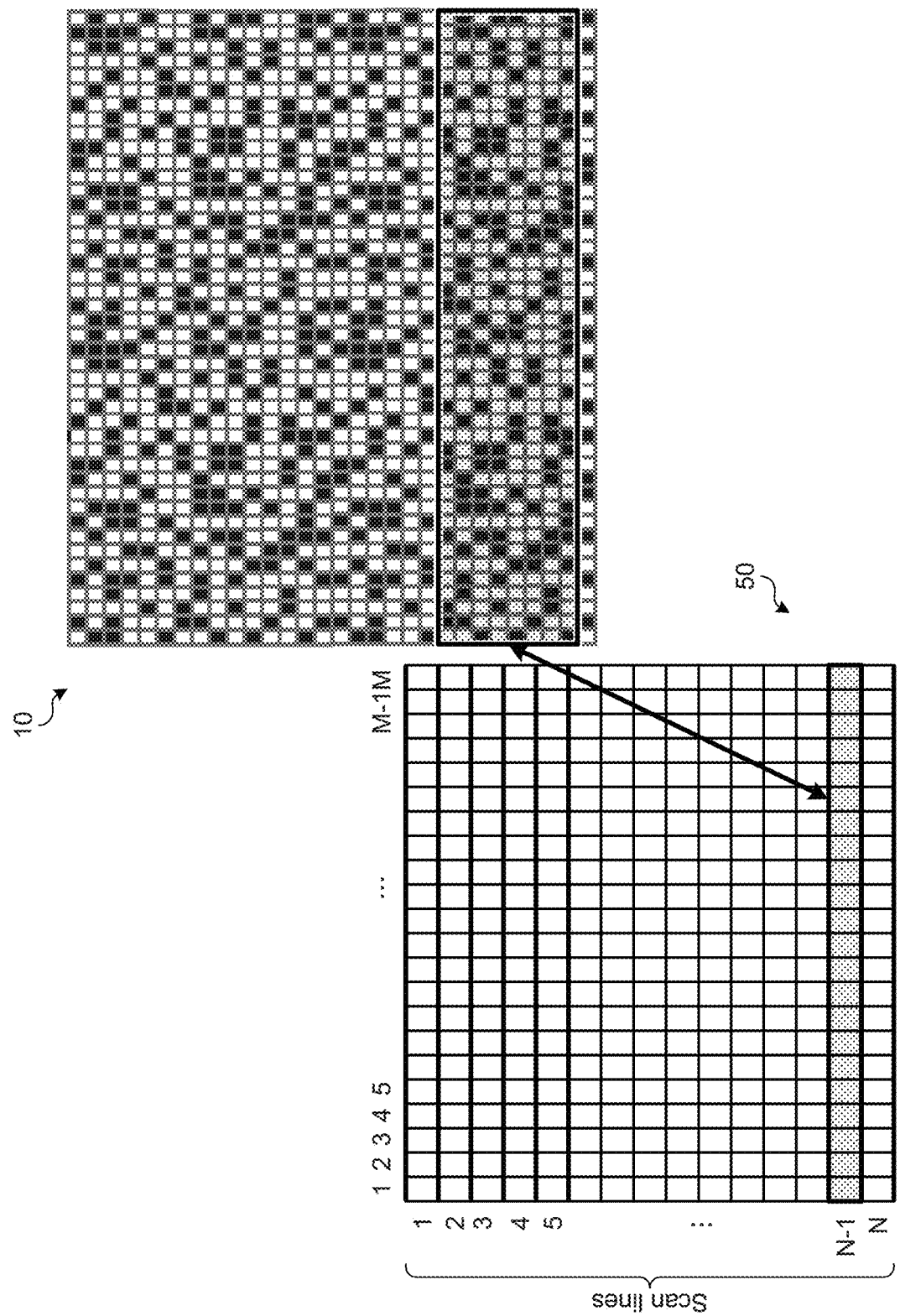
FIG. 16 is an explanatory diagram (part 5) for explaining the rolling shutter system according to the embodiment of the present disclosure.
Figure 17:
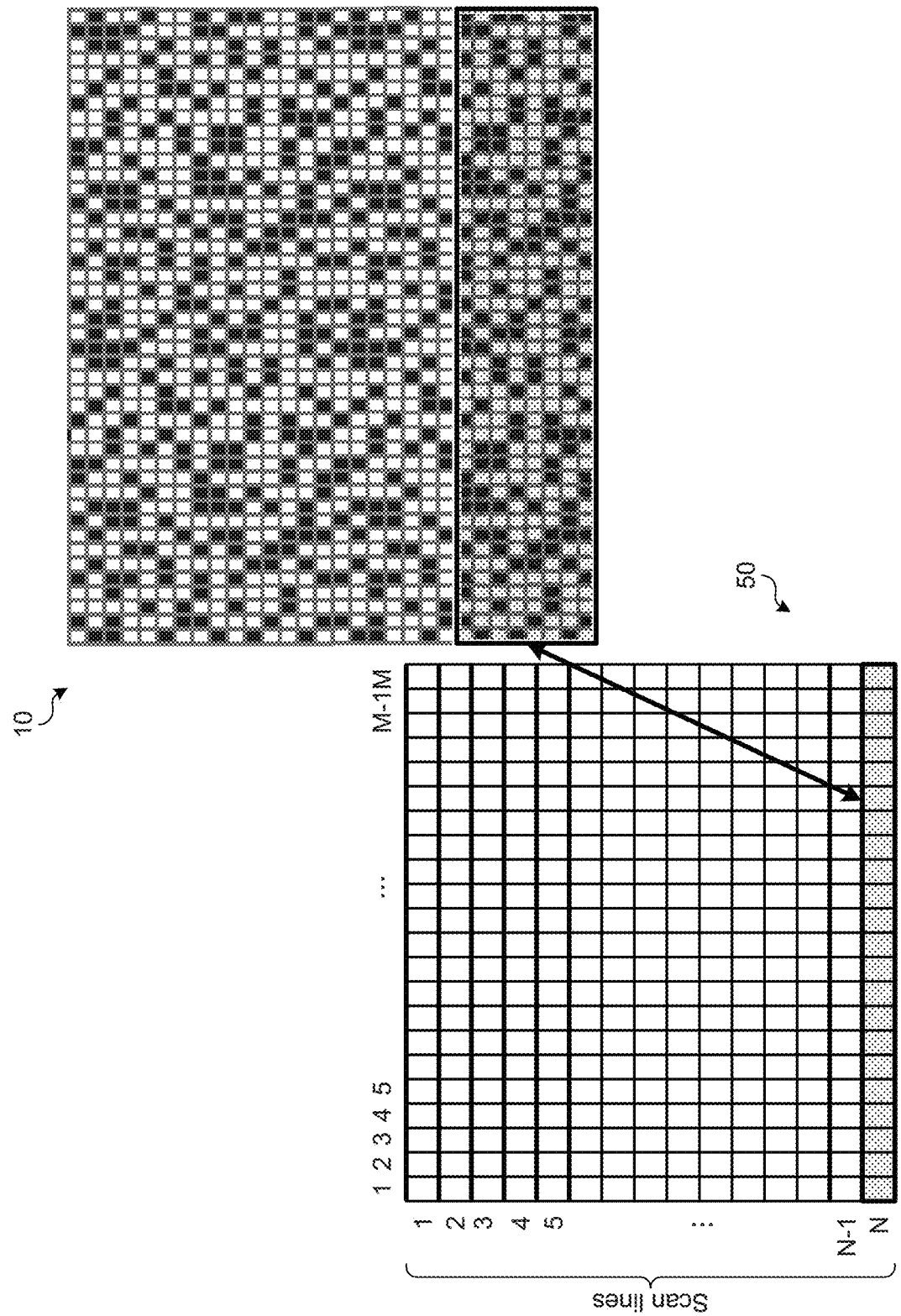
FIG. 17 is an explanatory diagram (part 6) for explaining the rolling shutter system according to the embodiment of the present disclosure.

Therefore, in the present embodiment, the binary mask 10 having a two-dimensional predetermined pattern according to the present embodiment described so far is applied to the imaging device 100 operating in the rolling shutter system as described above. An embodiment of such a rolling shutter system will be described with reference to FIGS. 13 to 17. FIGS. 13 to 17 are explanatory diagrams for explaining a rolling shutter system in the present embodiment. Specifically, FIG. 13 is a diagram for describing acquisition of observation data (signals) in the scanning line of the first row of the image sensor 50, and FIG. 14 is a diagram for describing acquisition of observation data (signals) in the scanning line of the second row of the image sensor 50. Furthermore, FIG. 15 is a diagram for describing acquisition of observation data (signals) in the scanning line of the third row of the image sensor 50, and FIG. 16 is a diagram for describing acquisition of observation data (signals) in the scanning line of the Nth−1 row of the image sensor 50. Furthermore, FIG. 17 is a diagram for explaining acquisition of observation data (signals) in the scanning line of the Nth row of the image sensor 50.

As illustrated in FIGS. 13 to 17, in the present embodiment, a region (surrounded by a rectangle in the drawing) of the binary mask 10 is determined so as to correspond to each scanning line. Then, in imaging of the rolling shutter system according to the present embodiment, the plurality of pixels 52 of each scanning line sequentially acquires observation data (signals) by the light having passed through the region of the determined binary mask 10 for each scanning line.

At this time, the size of the region of the binary mask 10 corresponding to each scanning line and the predetermined pattern of the binary mask 10 are determined in consideration of the aspect ratio of each scanning line so that appropriate encoding can be performed. That is, also here, the region of the binary mask 10 having the two-dimensional predetermined pattern according to the present embodiment as described above is used.

In the examples illustrated in FIGS. 13 to 17, a part of the region of the binary mask 10 is shared between the scanning lines vertically adjacent to each other in the drawing. However, by using the binary mask 10 having the two-dimensional predetermined pattern according to the present embodiment as described above, even in a case where a part of the region of the binary mask 10 is shared, it is possible to appropriately encode each piece of observation data (signal) based on light from each point of the scene. In other words, in the present embodiment, it is easy to specify the observation data corresponding to each scanning line of the image sensor 50. As a result, according to the present embodiment, riot only a plurality of captured images can be obtained by reconstructing the observation data acquired in each scanning line, but also the quality between the obtained captured images can be uniformly maintained. Furthermore, according to the present embodiment, even in one imaging, a plurality of captured images can be reconstructed from the observation data acquired in each scanning line, so that a plurality of consecutive captured images can be acquired at a high frame rate. For example, in the examples illustrated in FIGS. 13 to 17, since the observation data is acquired for every N scanning lines, N captured images can be reconstructed, and thus, for example, the frame rate can be increased from F(fps) to FN(fps).

Furthermore, in the present embodiment, as illustrated in FIGS. 13 to 17, it is not limited to acquiring the observation data for each scanning line of one row, and the observation data may be acquired for each of a plurality of scanning lines (scanning line group) according to a desired frame rate. Even in this case, the size of the region of the binary mask 10 corresponding to each scanning line group and the predetermined pattern of the binary mask 10 are determined in consideration of the aspect ratio of each scanning line group so that appropriate encoding can be performed.

Figure 18:
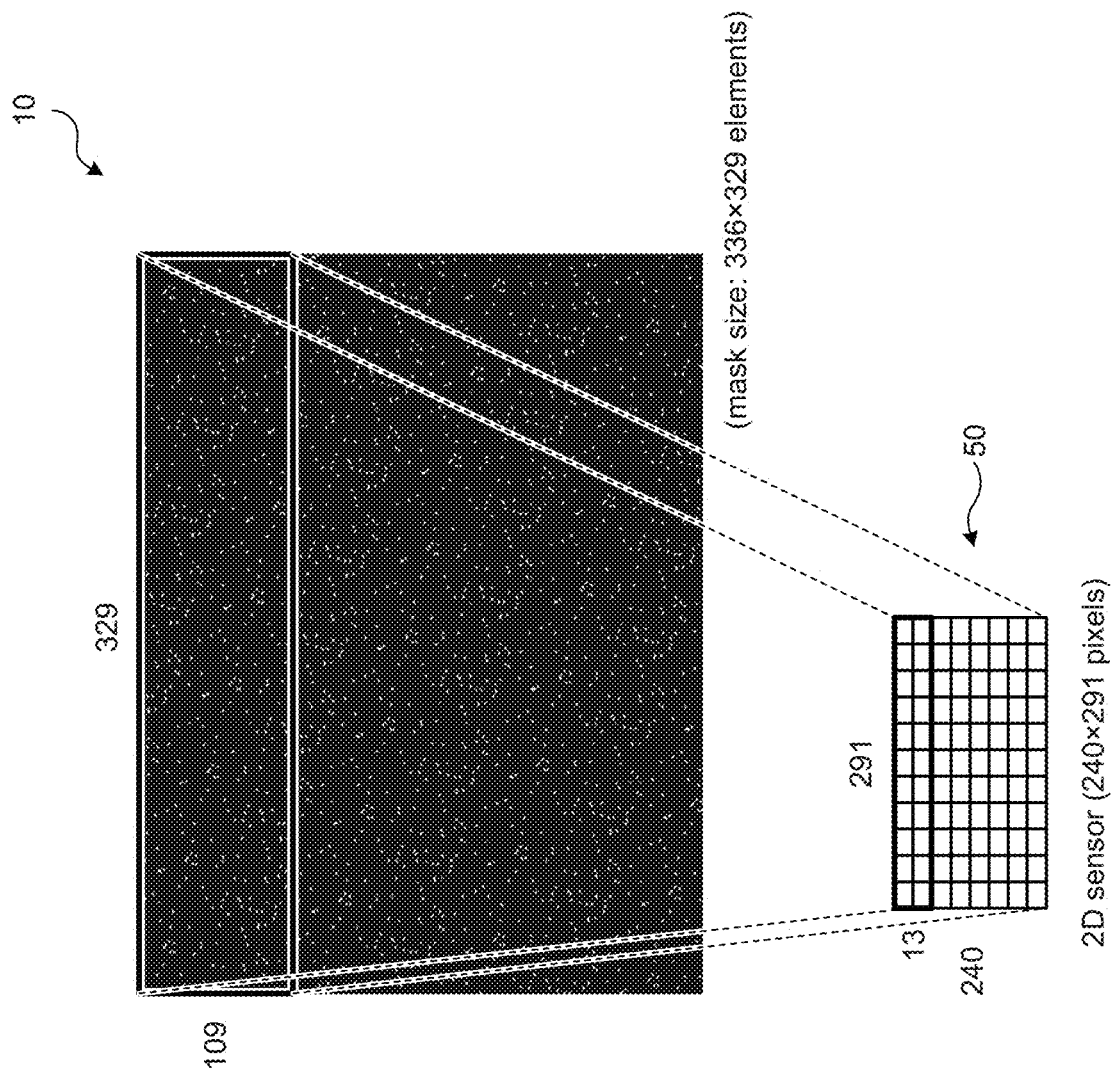
FIG. 18 is an explanatory diagram for explaining a first example in the rolling shutter system.

Note that, in the embodiment of the present disclosure, the binary mask 10 having the two-dimensional predetermined pattern described above is not limited to be applied to the imaging device 100 operating in the roiling shutter system as described above, and may be applied to, for example, the imaging device 100 operating in the global shutter system First Example Next, a first example will be described with reference to FIG. 18. FIG. 18 is an explanatory diagram for explaining the first example in the rolling shutter system Here, a case where a two-dimensional image sensor 50 having 291×240 pixels 52 is used, a frame rate of one imaging is F, a subframe rate in the rolling shutter is 18F, and a resolution with respect to the scene is 39×97 is considered.

In such a case, in the imaging by the rolling shutter system, since the subframe rate is 18F, observation data (signal) is acquired for each scanning line group including 13 rows of scanning lines on the image sensor 50

In this case, in the present embodiment, a one-dimensional sequence (one-dimensional pattern) having a length L=97×39=3783 is folded to generate a two-dimensional predetermined pattern. The resolution ($P_x \times P_y$) of the scene is 97×39, and the ($N_x \times N_y$) of the scanning line group is 291×13. Therefore, when the two-dimensional predetermined pattern is generated, conditions of $a_x$=1, $a_y$=1, and D=39 are used as the parameters $a_x$, $a_y$, and D (see the formula (7)) satisfying the formulas (6), (8), and (10) described above. For example, the predetermined pattern of the region corresponding to the scanning line group of the binary mask 10 illustrated in FIG. 18 has a of 329×109 when defined by the number of unit elements. Furthermore, in order to cover the resolution in the horizontal direction for 240 rows, the overall size of the binary mask 10 is 329×336 (109−13+240).

According to the present example, by using the binary mask 10 as described above, even in a case where each scanning line group (scanning line group including 13 rows of scanning lines) shares a part of the region of The binary mask 10, it is possible to appropriately encode each of the observation data (signals) based on the light from each point of the scene. As a result, according to the present example, not only a plurality of captured images can be obtained by reconstructing the observation data acquired in each scanning line group, but also the quality between the obtained captured images can be uniformly maintained. Furthermore, according to the present example, even in one imaging, 18 captured images can be reconstructed, and the frame rate can be increased from F(fps) to 18F(fps)

Second Example

Figure 19:
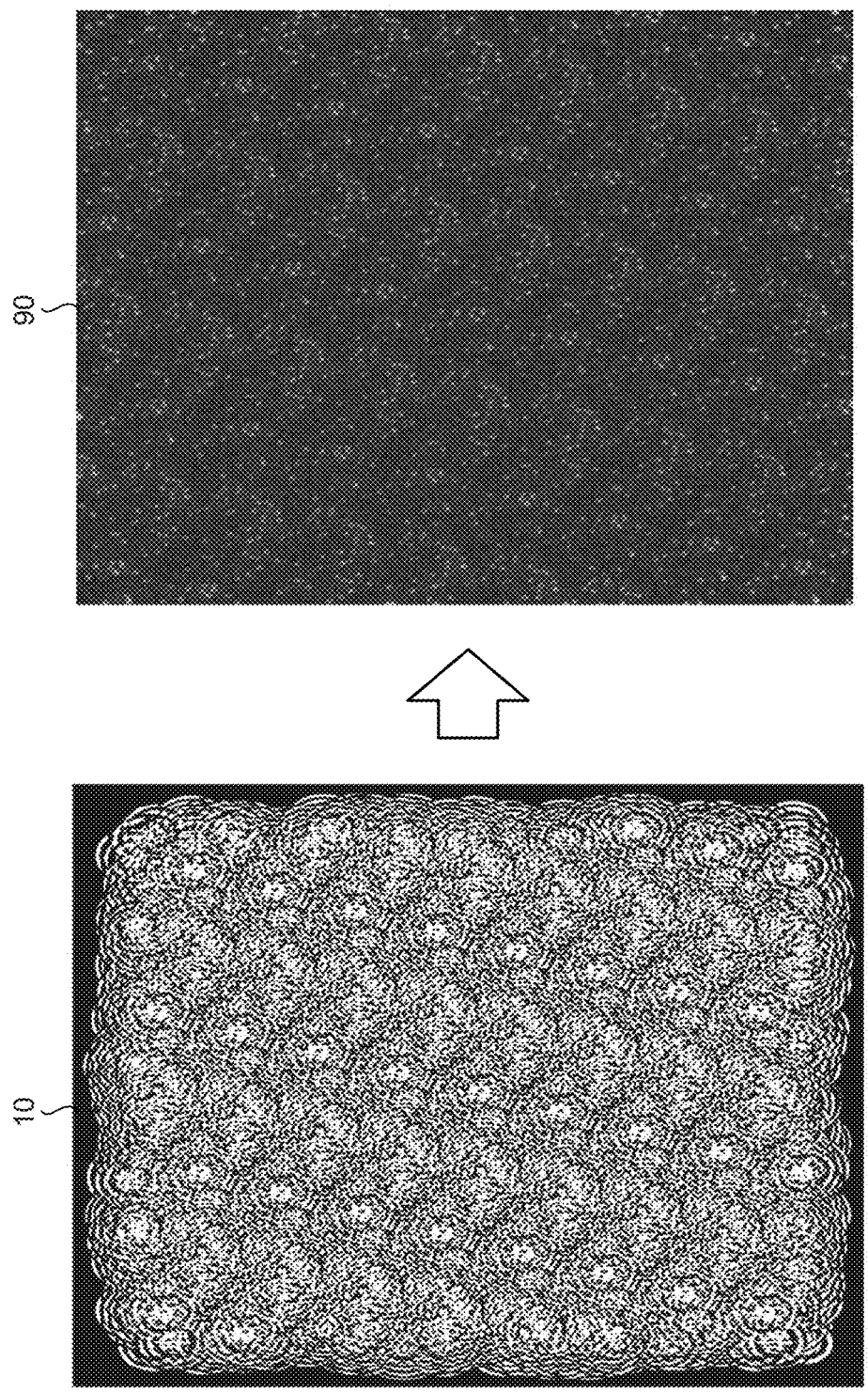
FIG. 19 is an explanatory diagram for explaining a binary mask 10 according to a modified example of the embodiment of the present disclosure.

Next, a second example will be described with reference to FIG. 19, FIG. 19 is an explanatory diagram for explaining a binary mask 10 according to a modified example of the present embodiment.

Meanwhile, in the first example described above, since the acquired observation data (signal) is sparse (for example, in the example of FIG. 18, the proportion of light transmission of the binary mask 10 is 1.6%), the captured image obtained by the reconstruction may be dark. Therefore, in the present example, in order to brighten the captured image, the binary mask 10 that simultaneously focuses light having passed through one light transmission filter 12 and light around the light transmission filter 12 on one point is used. Examples of such a binary mask 10 include a binary mask having a predetermined pattern including the light transmission filters 12 and the light non-transmission filters 14 arranged in a Fresnel pattern as illustrated on a left side of FIG. 19.

On a left side of FIG. 19, the binary mask 10 can be formed by determining the distribution of the Fresnel patterns on the condition that a pixel pitch of the image sensor 50 is 30 μm, a distance between the binary mask 10 and the image sensor 50 is 10 mm, and an average wavelength of light from the scene is about 530 nm. Then, by using such a binary mask 10, a captured image having favorable brightness, contrast, and uniformity can be obtained as illustrated on the right side of FIG. 19.

Figure 20:
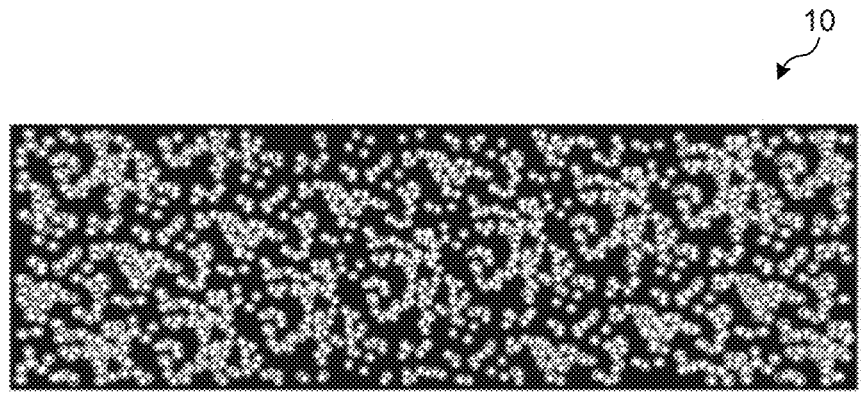
FIG. 20 is a diagram of a binary mask 10 according to a third example.

That is, the embodiment of the present disclosure is not limited to using the binary mask 10 having a predetermined pattern including the light transmission filters 12 and the light non-transmission filters 14 arranged in a two-dimensional lattice pattern. For example, in the embodiment of the present disclosure, a binary mask 10 having a predetermined pattern including the light transmission filters 12 and the light non-transmission filters 14 arranged in a Fresnel pattern as illustrated in FIG. 19 may be used. Further, in the embodiment of the present disclosure, a diffraction grating element may be used, or a uniform redundant array mask may be used. Furthermore, in the embodiment of the present disclosure, a plurality of binary masks 10 may be used Third Example Next, a third example will be described with reference to FIG. 20. FIG. 20 is a diagram of a binary mask 10 according to the third example. Here, it is assumed that a two-dimensional image sensor 50 having 3072×2048 pixels 52 with a pixel pitch of 2.4 μm is used. Specifically, here, it is assumed that the resolution ($P_x \times P_y$) of the scene is 721×31 and the size ($N_x \times N_y$) of the scanning line group is 103×217.

In the present example, in order to obtain the binary mask 10 having a two-dimensional predetermined pattern, a two-dimensional predetermined pattern is generated by folding a one-dimensional sequence (one-dimensional pattern) having a length L=22351 using the conditions of $a_x$=1, $a_y$=1, and D=31 as the parameters $a_x$, $a_y$, and D satisfying the formulas (6), (8), and (10). Then, in the present example, the size of the binary mask 10 illustrated in FIG. 20 is 823×247, and the specific length of the binary mask 10 is 33.6 μm (equal to the length of 14 pixels 52). Then, as illustrated in FIG. 20, the binary mask 10 according to the present example can be a binary mask having a predetermined pattern including light transmission filters and light non-transmission filters arranged in a Fresnel pattern. Such a binary mask 10 can be formed by photolithography and etching on a copper thin film laminated on a glass substrate.

In the present example, resolution and a signal to noise ratio (SNR) can be improved by using such a binary mask 10. More specifically, in order to evaluate the binary mask 10 of the present example, under the condition that the distance between the binary mask 10 and the image sensor 50 is set to 17.28 mm and the viewing angle on the horizontal axis is 70 degrees, the binary mask 10 according to the present example was installed in front of a 55 inch full high vision display, and the image reconstruction was attempted. Here, patterns and texts having different aspect ratios (short in a vertical direction and long in a horizontal direction) are displayed on the display. Under such conditions, when an image was reconstructed using the binary mask 10 according to the present example, it was confirmed that the image was suitably reconstructed.

Fourth Example

Figure 21:
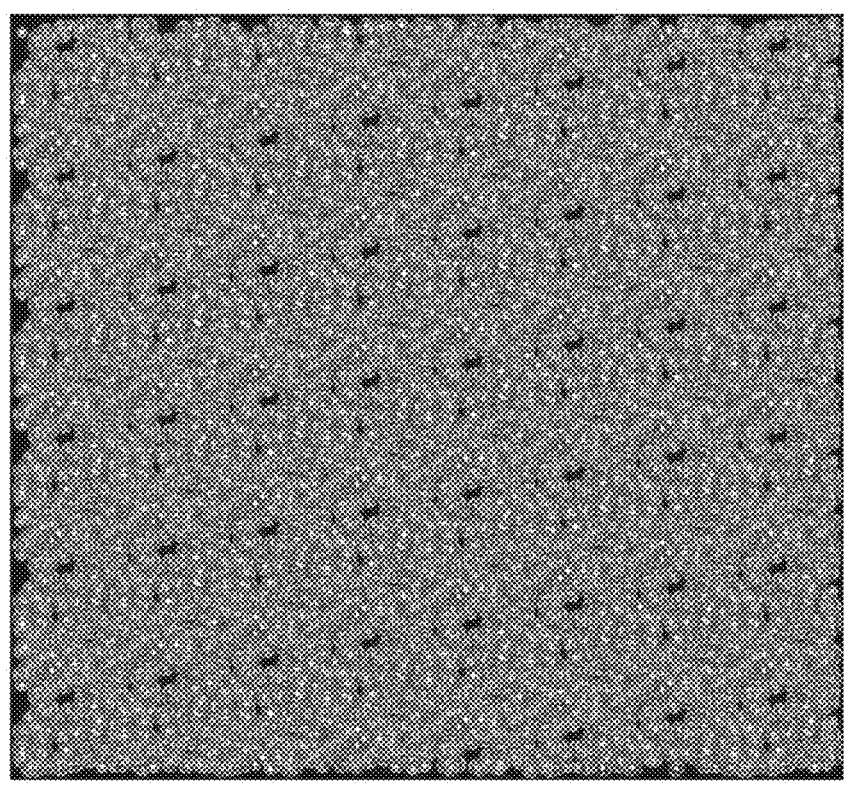
FIG. 21 is a diagram of a binary mask 10 according to a fourth example.

Next, an example of a binary mask 10 capable of realizing a high frame rate will be described with reference to FIG. 21. Here, it is assumed that a two-dimensional image sensor 50 having 33 sections of 331×1183 is used and the resolution with respect to the scene is 217×169. Then, in the present example, an attempt is made to reconstruct an image using the rotary fan as a fast moving object using the binary mask 10 illustrated in FIG. 21.

In the present example, 33 times of image data can be obtained at a time by using the rolling shutter system In other words, 33 images can be, reconstructed from one image data by one image sensor 50. Therefore, in the present example, by performing imaging at a frame rate of 60 fps by the image sensor 50, a final frame rate is 33×60 fps×1980 fps, and thus a high frame rate can be realized. Furthermore, when the image was reconstructed under such conditions, it was found that the image quality was uniform and suitable in all the images. That is, according to the present example, it has become clear that, by using the binary mask 10 according to the present embodiment, it is possible to efficiently reconstruct an image without being affected by high-speed movement of a subject even when the subject moves at a high speed.

<3.10 Image Processing Apparatus>

Figure 22:
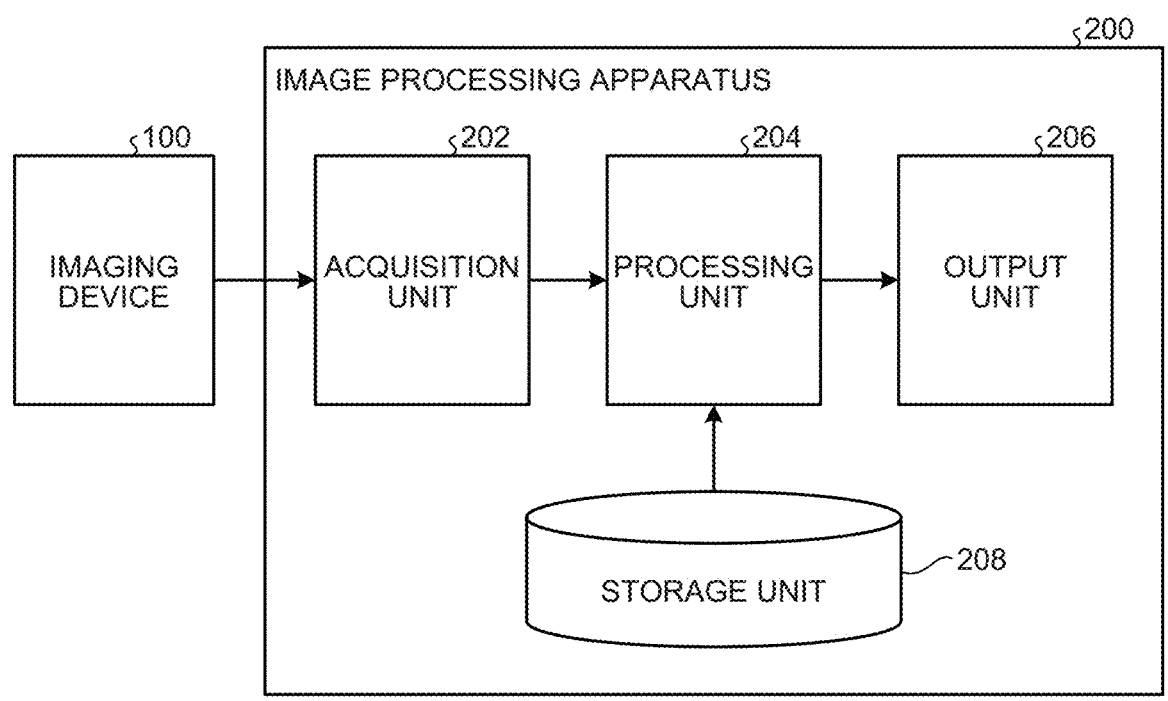
FIG. 22 is a block diagram illustrating an example of a functional configuration of an image processing apparatus according to an embodiment of the present disclosure.

A detailed configuration of an image processing apparatus 200 according to the present embodiment be described with reference to FIG. 22. FIG. 22 is a block diagram illustrating an example of a functional configuration of the image processing apparatus 200 according to the present embodiment. As illustrated in FIG. 22, the image processing apparatus 200 can mainly include an acquisition unit 202, a processing unit 204, an output unit 206, and a storage unit 208. Hereinafter, each functional block of the image processing apparatus 200 will be sequentially described (Acquisition Unit 202)

The acquisition unit 202 acquires observation data (signal) output from the image sensor 50 of the imaging device 100, and outputs the observation data (signal) to the processing unit 204 described later.

(Processing Unit 204)

The processing unit 204 reconstructs a captured image of a desired scene on the basis of the observation data (signal) from the acquisition unit 202 described above and information of a predetermined pattern, of the binary mask 10 stored in the storage unit 208 described later. Furthermore, the processing unit 204 outputs the captured image obtained by the reconstruction to the output unit 206 described later.

(Output Unit 206)

The output unit 206 is a functional unit for outputting a captured image to the user, and is realized by, for example, a display or the like.

(Storage Unit 208)

The storage unit 208 stores programs, information, and the like for the above-described processing unit 204 to execute image processing, information obtained by the processing, and the like. Specifically, the storage unit 208 stores information such as a predetermined pattern of the binary mask 10. Note that the storage unit 208 is realized by, for example, a nonvolatile memory such as a flash memory.

<3.11 Image Processing Method>

Figure 23:
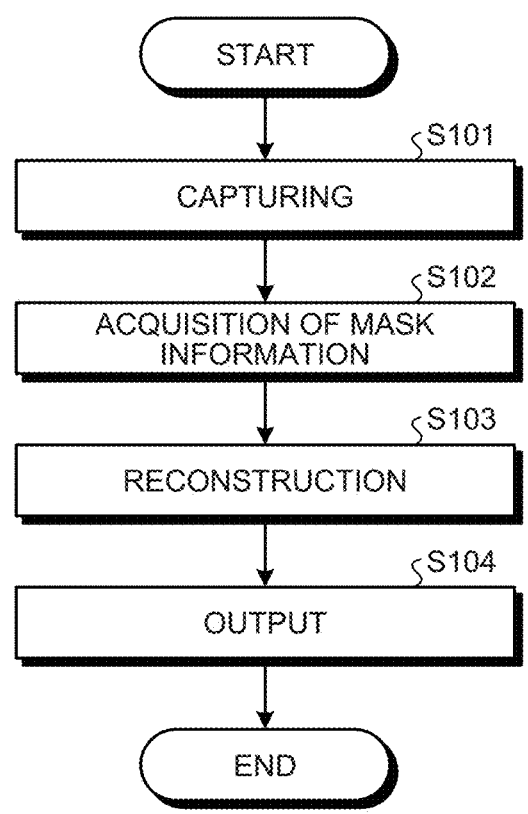
FIG. 23 is a flowchart of an image processing method according to an embodiment of the present disclosure.

Next, an image processing method according to the present embodiment will be described with reference to FIG. 23. FIG. 23 is a flowchart of the image processing method according to the present embodiment. As illustrated in FIG. 23, the image processing method according to the present embodiment can mainly include steps from Step S101 to Step S104. Details of these steps according to the present embodiment will be described below.

First, a scene is captured by the above-described imaging device 100 (Step S101). Then, the image processing apparatus 200 acquires, from the imaging device 100, observation data (signal) generated by the light passing through the binary mask 10 being received by the image sensor 50.

Next, the image processing apparatus 200 acquires mask information that is information of a predetermined pattern of the binary mask 10 (Step S102). Specifically, the mask information is, for example, two-dimensional predetermined pattern information including the light transmission filters 12 and the light non-transmission filters 14 of the binary mask 10.

Next, the image processing apparatus 200 calculates an inverse matrix (pseudo inverse matrix) on the basis of the mask information acquired in Step S102 described above. Then, the image processing apparatus 200 reconstructs the captured image of the desired scene by multiplying the observation data acquired from the imaging device 100 by the calculated inverse matrix (Step S103).

Furthermore, the image processing apparatus 200 outputs the captured image reconstructed in Step S103 described above to the user or the like (Step S104), and ends the processing.

<3.12 Summary>

As described above, according to the embodiment of the present disclosure described above, it is possible to provide the imaging device 100, the optical element (For example, binary mask 10), the image processing apparatus (image processing system) 200, and the image processing method, which are capable of easily reconstructing a captured image of an actual scene without deteriorating quality, by using the image sensor 50 having an aspect ratio different from the aspect ratio of the scene.

Specifically, in the embodiment of the present disclosure, an optical element (for example, binary mask 10) having a predetermined pattern having an autos correlation function having a sharp peak and having very small side lobes with respect to the peak is used. According to the optical element, since the predetermined pattern is provided as described above, X in the above formula can be efficiently and robustly obtained, and each observation data (signal) based on the light from each point of the scene superimposed and acquired in each pixel (region) 52 of the image sensor 50 can be encoded. As a result, according to the embodiment of the present disclosure, a captured image of an actual scene can be reconstructed from the observation data. Furthermore, since the predetermined pattern of the optical element has substantially constant (desirably, constant) side lobes, even if the aspect ratio of the scene and the aspect ratio of the image sensor are mismatched, X in the above formula (2) can be efficiently and robustly obtained. As a result, according to the embodiment of the present disclosure, it is possible to avoid deterioration in quality of the reconstructed captured image.

Furthermore, in the present embodiment, the two-dimensional predetermined pattern including the plurality of two-dimensional basic patterns repeated while being periodically positionally displaced in the optical element can be easily generated by folding a one-dimensional pattern having a substantially constant (desirably, constant) autocorrelation function of side lobes on the basis of a predetermined rule.

Further, according to the embodiment of the present disclosure, since the imaging device 100 has a simple configuration, by suitably forming the optical element so as to have the above-described pattern, calibration of the imaging system can be made unnecessary, and eventually, imaging can be easily performed.

Furthermore, in the embodiment of the present disclosure, for example, the binary mask 10 having a predetermined pattern including the light transmission filters 12 and the light non-transmission filters 14 arranged in a two-dimensional lattice pattern can be used as the optical element. In the embodiment of the present disclosure, for example, the binary mask 10 having a predetermined pattern including the light transmission filters 12 and the light non-transmission filters 14 arranged in a Fresnel pattern can be used as the optical element. Further, in the embodiment of the present disclosure, for example, a diffraction grating element can be used as the optical element. That is, in the embodiment of the present disclosure, the degree of freedom in designing the optical element is high.

Further, in the embodiment of the present disclosure, in a case where the present disclosure is applied to the rolling shutter system, a plurality of consecutive captured images can be acquired at a high frame rate from one imaging. Furthermore, according to the embodiment of the present disclosure, it is easy to specify observation data corresponding to each scanning line or each scanning line group (Specifically, each scanning line group includes a predetermined number of scanning lines.) of the image sensor 50. Moreover, according to the embodiment of the present disclosure, it is possible to uniformly maintain the quality between the captured images obtained by reconstructing the observation data acquired in each scanning line or each scanning line group.

<<4. Hardware Configuration>>

Figure 24:
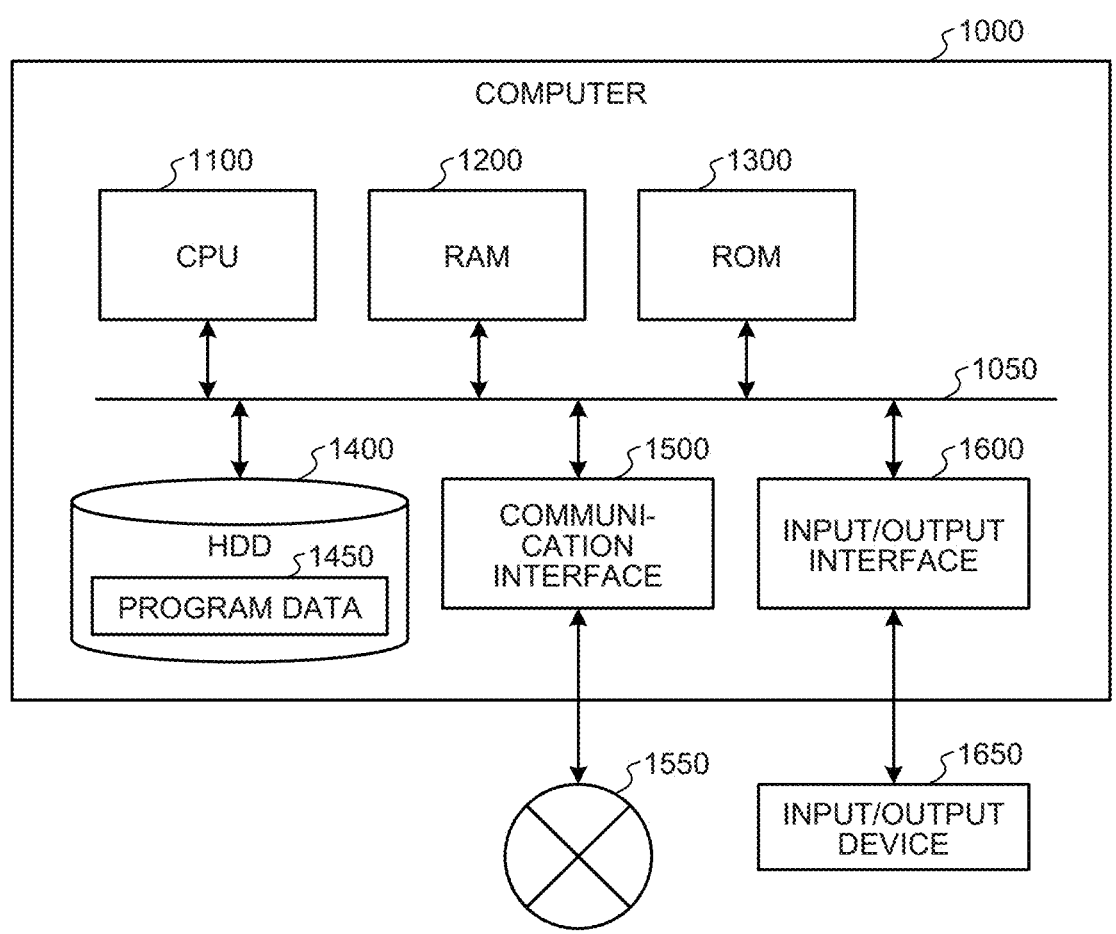
FIG. 24 is a hardware configuration diagram illustrating an example of a computer 1000 that implements functions of the image processing apparatus 200 according co the embodiment of the present disclosure.

The image processing apparatus 200 according to the embodiment of the present disclosure described above is realized by, for example, a computer 1000 having a configuration as illustrated in FIG. 24. Hereinafter, the image processing apparatus 200 according to the embodiment of the present disclosure will be described as an example. FIG. 24 is a hardware configuration diagram illustrating an example of the computer 1000 that implements the functions of the image processing apparatus 200. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050

The CPU 1100 operates on the basis of a program stored in the RCM 1300 or the HDD 1400, and controls each unit. For example, the CPU 1100 develops a program stored in the ROM 1300 or the HDD 1400 in the RAM 1200, and executes processing corresponding to various programs.

The RCM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an arithmetic processing program according to the present disclosure, which is an example of program data 1450.

The communication interface 1500 is an interface for the computer 1000 to connect to an external network 1550 (for example, the Internet). For example, the CPU 1100 receives data from another device or transmits data. Generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the image processing apparatus 200 according to the embodiment of the present disclosure, the CPU 1100 of the computer 1000 executes the arithmetic processing program loaded on the RAM 1200 to implement the functions of the processing unit 204 (see FIG. 22) and the like. In addition, the HDD 1400 stores an image processing program and the like according to the embodiment of the present disclosure. Note that the CPU 1100 reads the program data 1450 from the HDD 1400 and executes the program data 1450, but as another example, these programs may be acquired from another device via the external network 1550.

Furthermore, the image processing apparatus 200 according to the present embodiment may be applied to a system including a plurality of apparatuses on the premise of connection to a network (or communication between devices), such as cloud computing. That is, the image processing apparatus 200 according to the present embodiment described above can also be implemented as an image processing system that performs image processing according to the present embodiment by a plurality of devices, for example.

<<5. Application Example to Endoscopic Surgery System>>

The technique according to the present disclosure (present technique) can be applied to various products. For example, the technique according to the present disclosure may be applied to an endoscopic surgery system.

Figure 25:
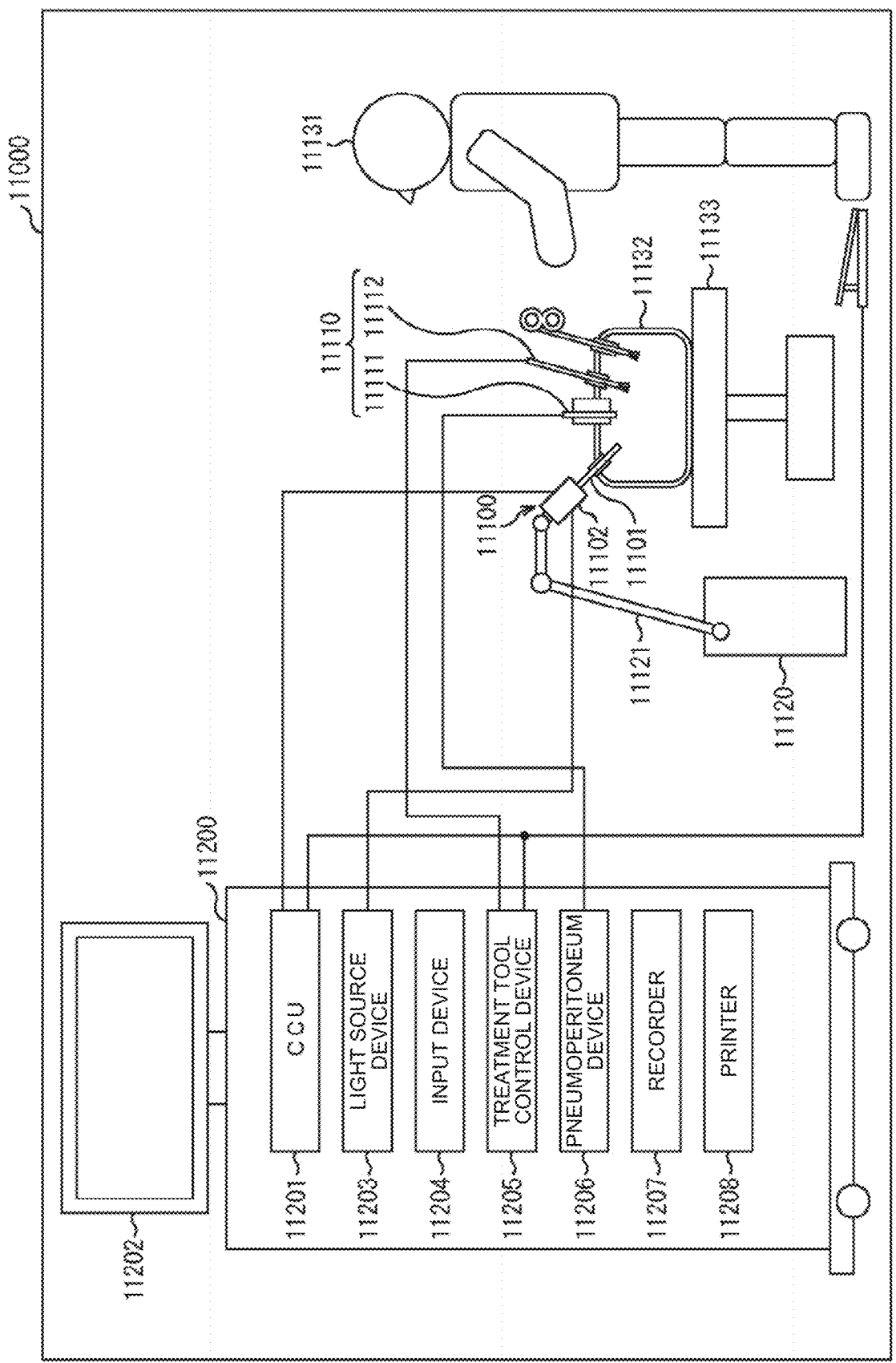
FIG. 25 is a diagram illustrating an example of a schematic configuration of an endoscopic surgery system.

FIG. 25 is a diagram illustrating an example of a schematic configuration of an endoscopic surgery system to which the technique according to the present disclosure (the present technique) can be applied.

FIG. 25 illustrates a state in which an operator (doctor) 11131 is performing surgery on a patient 11132 on a patient bed 11133 using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted The endoscope 11100 includes a lens barrel 11101 whose region of a predetermined length from a distal end is inserted into a body cavity of the patient 11132, and a camera head 11102 connected to a proximal end of the lens barrel 11101. In the illustrated example, the endoscope 11100 configured as a so-called rigid scope having the rigid lens barrel 11101 is illustrated, but the endoscope 11100 may be configured as a so-called flexible scope having a flexible lens barrel.

An opening portion into which an objective lens is fitted is provided at the distal end of the lens barrel 11101. A light source device 11203 is connected to the endoscope 11100, and light generated by the light source device 11203 is guided to the distal end of the lens barrel by a light guide extending inside the lens barrel 11101, and is emitted toward an observation target in the body cavity of the patient 11132 via the objective lens. Note that the endoscope 11100 may be a forward-viewing endoscope, an oblique-viewing endoscope, or a side-viewing endoscope.

An optical system and an imaging element are provided inside the camera head 11102, and reflected light (observation light) from the observation target is condensed on the imaging element by the optical system. The observation light is photoelectrically converted by the imaging element, and an electric signal corresponding to the observation light, that is, an image signal corresponding to the observation image is generated. The image signal is transmitted to a camera control an it (CCU) 11201 as RAW data.

The CCU 11201 includes a central processing unit (CPU), a graphics processing unit (GPU), and the like, and integrally controls operation of the endoscope 11100 and a display device 11202. Furthermore, the CCU 11201 receives an image signal from the camera head 11102, and performs various types of image processing for displaying an image based on the image signal, such as development processing (demosaic processing), on the image signal.

The display device 11202 displays an image based on the image signal subjected to the image processing by the CCU 11201 under the control of the CCU 11201.

The light source device 11203 includes a light source such as a light emitting diode (LED), for example, and supplies irradiation light for imaging a surgical site or the like to the endoscope 11100.

An input device 11204 is an input interface for the endoscopic, surgery system 11000 The user can input various types of information and instructions to the endoscopic surgery system 11000 via the input device 11204. For example, the, user inputs an instruction or the like to change imaging conditions (type of irradiation light magnification, focal length, and the like) by the endoscope 11100.

A treatment tool control device 11205 controls driving of the energy treatment tool 11112 for cauterization and incision of tissue, sealing of a blood vessel, or the like. A pneumoperitoneum device 11206 feeds a gas into the body cavity of the patient 11132 via the pneumoperitoneum tube 11111 in order to inflate the body cavity for the purpose of securing a visual field by the endoscope 11100 and securing a working space of the operator. A recorder 11207 is a device capable of recording various types of information regarding surgery. A printer 11208 is a device capable of printing various types of information regarding surgery in various formats such as text, image, or graph.

Note that the light source device 11203 that supplies the endoscope 11100 with the irradiation light at the time of imaging the surgical site can include, for example, an LED, a laser light source, or a white light source including a combination thereof. In a case where the white light source includes a combination of PGE laser light sources, since the output intensity and the output timing of each color (each wavelength) can be controlled with high accuracy, adjustment of the white balance of a captured image can be performed in the light source device 11203. Furthermore, in this case, by irradiating the observation target with the laser light from each of the RGB laser light sources in a time division manner, and controlling the driving of the imaging element of the camera head 11102 in synchronization with the irradiation timing, it is also possible to capture an image corresponding to each of RGB in a time division manner. According to this method, a color image can be obtained without providing a color filter in the imaging element.

Further, the driving of the light source device 11203 may be controlled so as to change the intensity of light to be output every predetermined time. By controlling the driving of the imaging element of the camera head 11102 in synchronization with the timing of the change of the intensity to acquire images in a time division manner, and synthesizing the images, it is possible to generate an image of a high dynamic range without so-called a black fullness and halation.

Furthermore, the light source device 11203 may be configured to be able to supply light in a predetermined wavelength band corresponding to special light observation. In the special light observation, for example, so-called narrow band imaging is performed in which a predetermined tissue such as a blood vessel a mucosal surface layer is imaged with high contrast by irradiating light in a narrower band than irradiation light (that is, white light) at the time of normal observation using wavelength dependency of light absorption in a body tissue. Alternatively, in the special light observation, fluorescence observation for obtaining an image by fluorescence generated by irradiation with excitation light may be performed in the fluorescence observation, it is possible to irradiate a body tissue with excitation. Light to observe fluorescence from the body tissue (autofluorescence observation), or to locally inject a reagent such as indocyanine green (ICG) into a body tissue and irradiate the body tissue with excitation light corresponding to a fluorescence wavelength of the reagent to obtain a fluorescent image, for example. The light source device 11203 can be configured to be able to supply narrow band light and/or excitation light corresponding to such special light observation.

Figure 26:
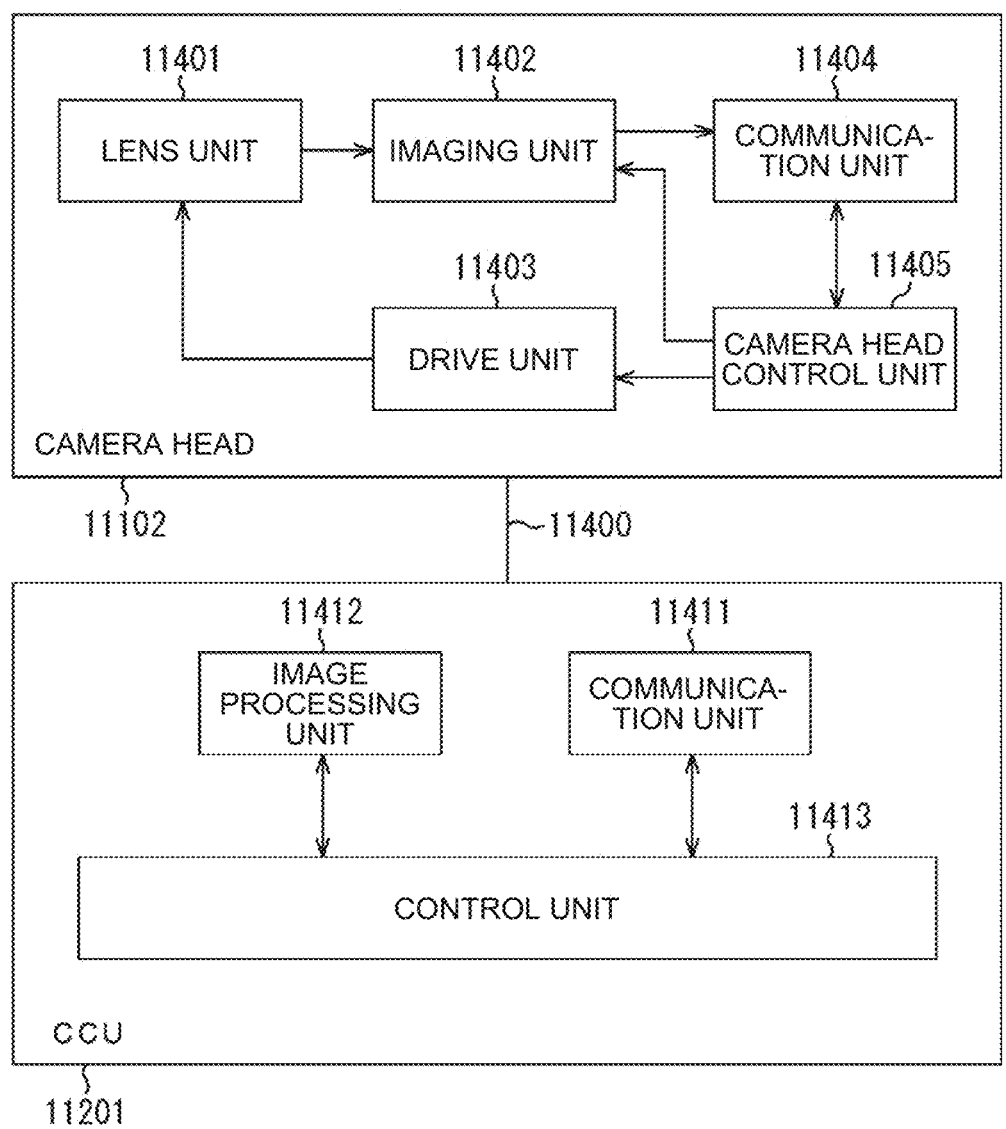
FIG. 26 is a block diagram illustrating an example of functional configurations of a camera head and a CCU.

FIG. 26 is a block diagram illustrating an example of functional configurations of the camera head 11102 and the CCU 11201 illustrated in FIG. 25.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. Observation light taken in from the distal end of the lens barrel 11101 is guided to the camera head 11102, and enters the lens unit 11401. The lens unit 11401 configured by combining a plurality of lenses including a zoom lens and a focus lens.

The number of imaging elements constituting the imaging unit 11402 may be one (so-called single-plate type) or a plurality (so-called multi-plate type). In a case where the imaging unit 11402 is configured as the multi-plate type, for example, image signals corresponding to RGB may be generated by the respective imaging elements, and a color image may be obtained by combining the image signals. Alternatively, the imaging unit 11402 may include a pair of imaging elements for acquiring right-eve and left-eye image signals corresponding to three-dimensional (3D) display. By performing the 3D display, the operator 11131 can more accurately grasp a depth of a living tissue in the surgical site. Note that, in a case where the imaging 11402 is configured as the multi-plate type, a plurality of lens units 11401 can be provided corresponding to the respective imaging elements.

Further, the imaging unit 11402 is not necessarily provided in the camera head 11102. For example, the imaging unit 11402 may be provided immediately after the objective lens inside the lens barrel 11101.

The drive unit 11403 includes an actuator, and moves the zoom lens and the focus lens of the lens unit 11401 by a predetermined distance along an optical axis under the control of the camera head control unit 11405. As a result, the magnification and focus of an image captured by the imaging unit 11402 can be appropriately adjusted.

The communication unit 11404 includes a communication device for transmitting and receiving various types of information to and from the CCU 11201. The communication unit 11404 transmits an image signal obtained from the imaging unit 11402 as RAW data to the CCU 11201 via the transmission cable 11400.

Furthermore, the communication unit 11404 receives a control signal for controlling driving of the camera head 11102 from the CCU 11201, and supplies the control signal to the camera head control unit 11405. The control signal includes, for example, information regarding imaging conditions such as information for specifying a frame rate of a captured image, information for specifying an exposure value at the time of imaging, and/or information for specifying a magnification and a focus of a captured image.

Note that the imaging conditions such as the frame rate, the exposure value, the magnification, and the focus may be appropriately specified by the user, or may be automatically set by the control unit 11413 of the CCU 11201 on the basis of the acquired image signal. In the latter case, a so-called auto exposure (AE) function, an auto focus (AF) function, and an auto white balance (AWB) function are installed in the endoscope 11100.

The camera head control unit 11405 controls driving of the camera head 11102 on the basis of the control signal from the CCU 11201 received via the communication unit 11404.

The communication unit 11411 includes a communication device for transmitting and receiving various types of information to and from the camera head 11102. The communication unit 11411 receives an image signal transmitted from the camera head 11102 via the transmission cable 11400.

Further, the communication unit 11411 transmits a control signal for controlling driving of the camera head 11102 to the camera head 11102. The image signal and the control signal can be transmitted by electric communication, optical communication, or the like.

The image processing unit 11412 performs various types of image processing on the image signal that is RAW data transmitted from the camera head 11102.

The control unit 11413 performs various types of control related to imaging of a surgical site or the like by the endoscope 11100 and display of a captured image obtained by imaging of the surgical site or the like. For example, the control unit 11413 generates a control signal for controlling driving of the camera head 11102.

Furthermore, the control unit 11413 causes the display device 11202 to display a captured image of a surgical site or the like on the basis of the image signal subjected to the image processing by the image processing unit 11412. At this time, the control unit 11413 may recognize various objects in the captured image using various image recognition technologies. For example, the control unit 11413 can recognize a surgical tool such as forceps, a specific body part, bleeding, mist at the time of using the energy treatment tool 11112, and the like by detecting the shape, color, and the like of an edge of an object included in the captured image. When displaying the captured image on the display device 11202, the control unit 11413 may superimpose and display various types of surgery support information on an image of the surgical site by using the recognition result. Since the surgery support information is superimposed and displayed and presented to the operator 11131, a burden on the operator 11131 can be reduced and the operator 11131 can reliably proceed with the surgery.

The transmission cable 11400 connecting the camera head 11102 and the CCU 11201 an electric signal cable compatible with electric signal communication, an optical fiber compatible with optical communication, or a composite cable thereof.

Here, in the illustrated example, communication is performed by wire using the transmission cable 11400, but communication between the camera head 11102 and the CCU 11201 may be performed wirelessly.

An example of the endoscopic surgery system to which the technique according to the present disclosure can be applied has been described above. The technique according to the present disclosure can be applied to the imaging unit 11402 and the like among the configurations described above.

Note that, here, the endoscopic surgery system has been described as an example, but the technique according to the present disclosure may be applied to, for example, a microscopic surgery system or the like.

<<6. Application Example to Mobile Body>>

The technique according to the present disclosure (present technique) can be applied to various products For example, the technique according to the present disclosure may be realized as a device mounted on any type of mobile body such as an automobile, an electric vehicle, a hybrid electric vehicle, a motorcycle, a bicycle, a personal mobility, an airplane, a drone, a ship, and a robot.

Figure 27:
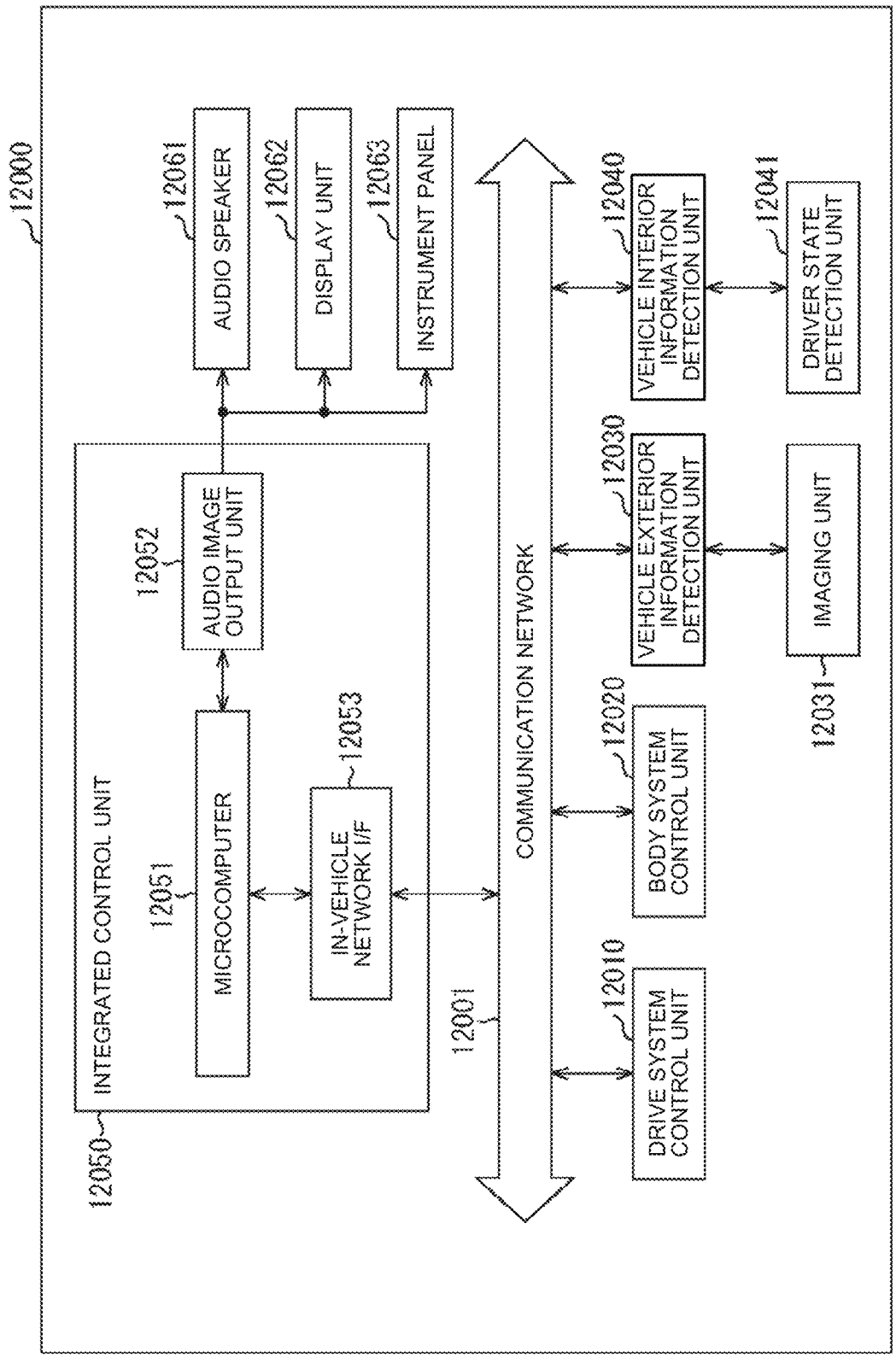
FIG. 27 is a block diagram illustrating an example of a schematic configuration of a vehicle control system.

FIG. 27 is a block diagram illustrating a schematic configuration example of a vehicle control system which is an example of a mobile body control system to which the technique according to the present disclosure can be applied A vehicle control system 12000 includes a plurality of electronic control units connected via a communication network 12001. In the example illustrated in FIG. 27, the vehicle control system 12000 includes a drive system control unit 12010, a body system control unit 12020, a vehicle exterior information detection unit 12030, a vehicle interior information detection unit 12040, and an integrated control unit 12050. Further, as a functional configuration of the integrated control unit 12050, a microcomputer 12051, an audio image output unit 12052, and an in-vehicle network interface (I/F) 12053 are illustrated.

The drive system control unit 12010 controls operations of devices related to the drive system of the vehicle according to various programs. For example, the drive system control unit 12010 functions as a control device of a driving force generation device for generating a driving force of a vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like.

The body system control unit 12020 controls operations of various devices mounted on a vehicle body according to various programs For example, the body system control unit 12020 functions as a control device of a keyless entry system, a smart key system, a power window device, or various lamps such as a head lamp, a back lamp, a brake lamp, a blinker, or a fog lamp. In this case, radio waves or signals of various switches transmitted from a portable device that substitutes for a key can be input to the body system control unit 12020. The body system control unit 12020 receives input of these radio waves or signals, and controls a door lock device, a power window device, a lamp, and the like of the vehicle.

The vehicle exterior information detection unit 12030 detects information outside the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle, and receives the captured image. The vehicle exterior information detection unit 12030 may perform object detection processing or distance detection processing of a person, a vehicle, an obstacle, a sign, a character on a road surface, or the like on the basis of the received image.

The imaging unit 12031 is an optical sensor that receives light and outputs an electric signal corresponding to an amount of the received light. The imaging unit 12031 can output the electric signal as an image or can output the electric signal as distance measurement information. Further, the light received by the imaging unit 12031 may be visible light or invisible light such as infrared rays.

The vehicle interior information detection unit 12040 detects information inside the vehicle. For example, a driver state detection unit 12041 that detects a state of a driver is connected to the vehicle interior information detection unit 12040. The driver state detection unit 12041 includes, for example, a camera that images the driver, and the vehicle interior information detection unit 12040 may calculate a degree of fatigue or a degree of concentration of the driver or may determine whether or not the driver is dozing off on the basis of detection information input from the driver state detection unit 12041.

The microcomputer 12051 can calculate a control target value of the driving force generation device, the steering mechanism, or the braking device on the basis of the information inside and outside the vehicle acquired by the vehicle exterior information detection unit 12030 or the vehicle interior information detection unit 12040, and output a control command to the drive system control unit 12010. For example, the microcomputer 12051 can perform cooperative control for the purpose of implementing functions of an advanced driver assistance system (ADAS) including collision avoidance or impact mitigation of the vehicle, follow-up traveling based on an inter-vein, distance, vehicle speed maintenance traveling, vehicle collision warning, vehicle lane departure warning, or the like.

Further, the microcomputer 12051 controls the driving force generation device, the steering mechanism, the braking device, or the like on the basis of information around the vehicle acquired by the vehicle exterior information detection unit 12030 or the vehicle interior information detection unit 12040, thereby performing cooperative control for the purpose of automatic driving or the like in which the vehicle autonomously travels without depending on an operation of the driver.

Furthermore, the microcomputer 12051 can output a control command to the body system control unit 12030 on the basis of vehicle exterior information acquired by the vehicle exterior information detection unit 12030. For example, the microcomputer 12051 can perform cooperative control for the purpose of preventing glare, such as switching from a high beam to a low beam, by controlling the head lamp according to a position of a preceding vehicle or an oncoming vehicle detected by the vehicle exterior information detection unit 12030.

The audio image output unit 12052 transmits an output signal of at least one of a sound or an image co an output device capable of visually or audibly notifying an occupant of the vehicle or the outside of the vehicle of information. In the example of FIG. 27, an audio speaker 12061, a display unit 12062, and an instrument panel 12063 are illustrated as the output device. The display unit 12062 may include, for example, at least one of an on-board display and a head-up display.

Figure 28:
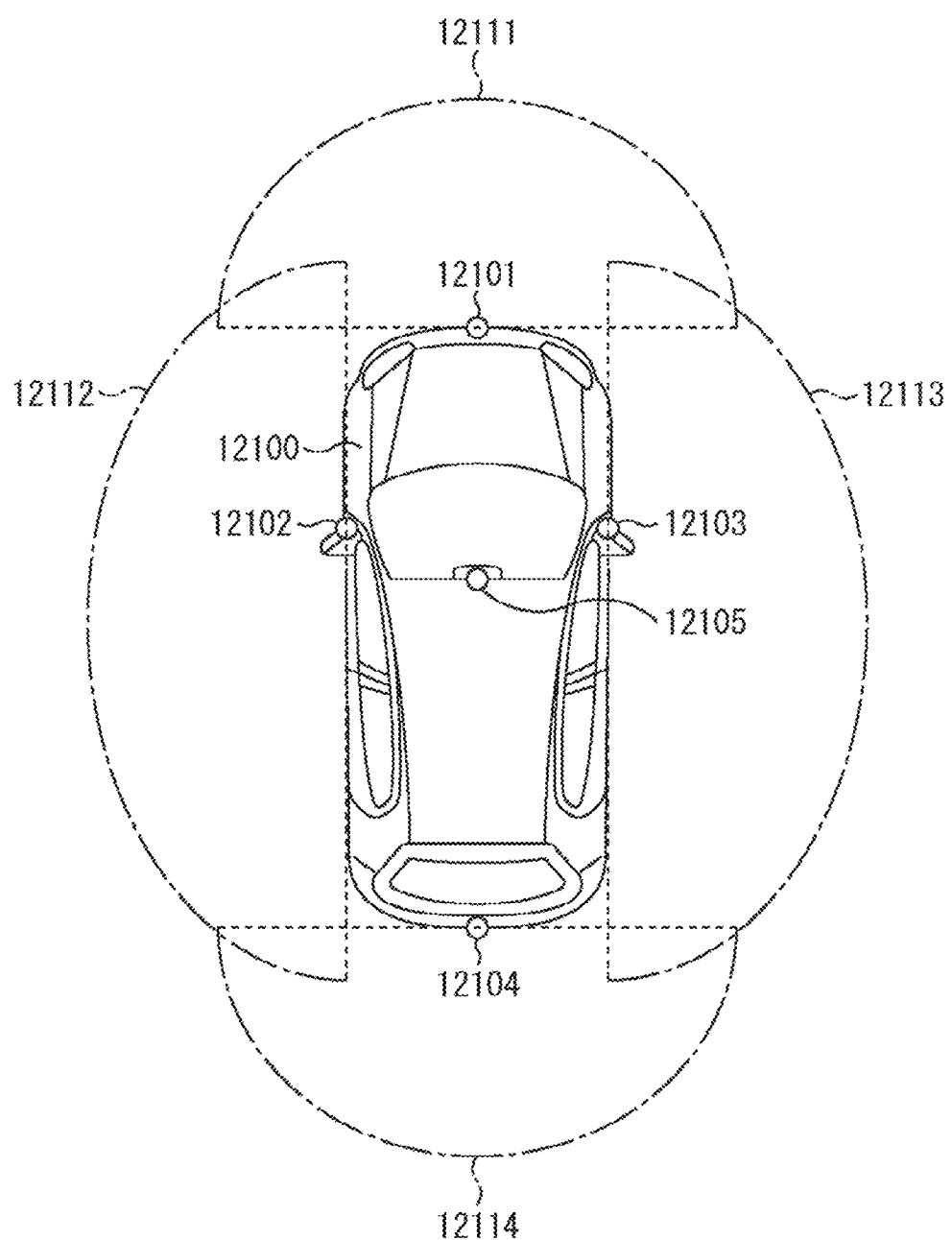
FIG. 28 is an explanatory diagram illustrating an example of installation positions of a vehicle exterior information detection unit and an imaging unit.

FIG. 28 is a diagram illustrating an example of an installation position of the imaging unit 12031.

In FIG. 28, imaging un its 12101, 12102, 12103, 12104, and 12105 are included as the imaging unit 12031.

The imaging units 12101, 12102, 12103, 12104, and 12105 are provided, for example, at positions such as a front nose, a side mirror, a rear bumper, a back door, and an upper part of a windshield in a vehicle interior of a vehicle 12100. The imaging unit 12101 provided at the front nose and the imaging unit 12105 provided at the upper part of the windshield in the vehicle interior mainly acquire images in front of the vehicle 12100. The imaging units 12102 and 12103 provided at the side mirrors mainly acquire images of the sides of the vehicle 12100. The imaging unit 12104 provided on the rear bumper or the back door mainly acquires an image behind the vehicle 12100 The imaging an it 12105 provided at the upper part of the windshield in the vehicle interior is mainly used to detect a preceding vehicle, a pedestrian, an obstacle, a traffic light, a traffic sign, a lane, or the like.

Note that FIG. 28 illustrates an example of imaging ranges of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 provided at the side mirrors, respectively, and an imaging range 12114 indicates an imaging range of the imaging unit 12104 provided at the rear bumper or the back door. For example, by superimposing image data captured by the imaging units 12101 to 12104, an overhead view-image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object in the imaging ranges 12111 to 12114 and a temporal change of the distance (relative speed with respect to the vehicle 12100) on the basis of distance information obtained from the imaging units 12101 to 12104, thereby extracting, as a preceding vehicle, a three-dimensional object traveling at a predetermined speed (for example, 0 km/h or more) in substantially the same direction as the vehicle 12100, in particular, the closest three-dimensional object on a traveling path of the vehicle 12100. Furthermore, the microcomputer 12051 can set an inter-vehicle distance to be secured in advance in front of the preceding vehicle, and can perform automatic brake control (including follow-up stop control), automatic acceleration control (including follow-up start control), and the like. As described above, it is possible to perform cooperative control for the purpose of automatic driving or the like in which the vehicle autonomously travels without depending on the operation of the driver.

For example, on the basis of the distance information obtained from the imaging units 12101 to 12104, the microcomputer 12051 can classify three-dimensional object data regarding three-dimensional objects into two-wheeled vehicles, ordinary vehicles, large vehicles, pedestrians, and other three-dimensional objects such as utility poles, extract the three-dimensional object data, and use the three-dimensional object data for automatic avoidance of obstacles. For example, the microcomputer 12051 identifies obstacles around the vehicle 12100 as obstacles that can be visually recognized by the driver of the vehicle 12100, and obstacles that are difficult to visually recognized. Then, the microcomputer 12051 determines a collision risk indicating a risk of collision with each obstacle, and when the collision risk is a set value or more and there is a possibility of collision, the microcomputer 12051 can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian is present in the captured images of the imaging units 12101 to 12104. Such pedestrian recognition is performed by, for example, a procedure of extracting feature points in the captured images of the imaging units 12101 to 12104 as infrared cameras, and a procedure of performing pattern matching processing on a series of feature points indicating a contour of an object to determine whether or not the object is a pedestrian. When the microcomputer 12051 determines that a pedestrian is present in the captured images of the imaging units 12101 to 12104, and recognizes the pedestrian, the audio image output unit 12052 controls the display unit 12062 co superimpose and display a square contour line for emphasis on the recognized pedestrian. Further, the audio image output unit 12052 may control the display unit 12062 to display an icon or the like indicating a pedestrian at a desired position.

An example of the vehicle control system to which the technique according to the present disclosure can be applied has been described above. The technique according to the present disclosure can be applied to the imaging unit 12031 and the like among the configurations described above.

<<7. Supplement>>

Note that the embodiment of the present disclosure described above can include, for example, a program for causing a computer to function as the image processing apparatus according to the present embodiment, and a non-transitory tangible medium on which the program is recorded. Further, the program may be distributed via a communication line (including wireless communication) such as the Internet.

Furthermore, each step in the image prescription method of the embodiment of the present disclosure described above may not necessarily be processed in the described order. For example, each step may be processed in an appropriately changed order. Further, each step may be partially processed in parallel or individually instead of being processed in time series. Furthermore, the processing method of each step may not necessarily be processed according to the described method, and may be processed by another method by another functional unit, for example.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

Further, the advantageous effects described in the present specification are merely illustrative or exemplary, and are not restrictive. That is, the technique according to the present disclosure can exhibit other advantageous effects obvious to those skilled in the art from the description of the present specification together with or instead of the above advantageous effects.

Note that the present technique can also have configurations below (1) An imaging device comprising:
    a line sensor or an area sensor having an aspect ratio different from an aspect ratio of a scene; and
    an optical element having a predetermined pattern and superimposed on the line sensor or the area sensor,
    wherein, in the optical element, an autocorrelation function of the predetermined pattern including a plurality of basic patterns repeated while being periodically positionally displaced has a peak and side lobes, and the side lobes are constant or substantially constant.

(2) The imaging device according to (1),
    wherein the optical element has the predetermined pattern including a two-dimensional pattern generated by folding a one-dimensional pattern having an autocorrelation function of constant or substantially constant side lobes based on a predetermined rule.

(3) The imaging device, according to (1) or (2),
    wherein the optical element is a binary mask having the predetermined pattern including a plurality of light transmission filters and a plurality of light non-transmission filters arranged in a two-dimensional lattice pattern.

(4) The imaging device according to (1) or (2),
    wherein the optical element is a binary mask having the predetermined pattern including a plurality of light transmission filters and a plurality of light non-transmission filters arranged in a Fresnel pattern.

(5) The imaging device according to (1) or (2), wherein the optical element is a diffraction grating.

(6) The imaging device according to any one of (1) to (5), wherein the line sensor or the area sensor has one or more rows including a plurality of pixels.

(7) The imaging device according to (6), wherein the area sensor operates in a rolling shutter system that acquires observation data at different timings for each of the rows (8) The imaging device according to (6), wherein the line sensor or the area sensor operates in a global shutter system in which the plurality of pixels simultaneously acquire observation data (9) The imaging device according to any one of (1) to (8), comprising a plurality of the optical elements.

(10) The imaging device according to any one of (1) to (9), wherein the optical element encodes each of observation data based on light from each point of the scene acquired in a superimposed manner in each region of the line sensor or the area sensor.

(11) The imaging device according to any one of (1) to (10), wherein the imaging device is a lensless camera.

(12) An optical element comprising a predetermined pattern and superimposed on a line sensor or an area sensor having an aspect ratio different from an aspect ratio of a scene,
    wherein, in the optical element, an autocorrelation function of the predetermined pattern including a plurality of basic patterns repeated while being periodically positionally displaced has a peak and side lobes, and the side lobes are constant or substantially constant.

(13) An image processing system comprising:
    an acquisition unit that acquires observation data observed by a line sensor or an area sensor having an aspect ratio different from an aspect ratio of a scene based on light from the scene transmitted through an optical element having a predetermined pattern and superimposed on the line sensor or the area sensor; and
    a processing unit that generates a captured image of the scene by reconstructing the observation data, wherein, in the optical element, an autocorrelation function of the predetermined pattern including a plurality of basic patterns repeated while being periodically positionally displaced has a peak and side lobes, and the side lobes are constant or substantially constant.

(14) An image processing method comprising:

acquiring observation data observed by a line sensor or an area sensor having an aspect ratio different from an aspect ratio of a scene based on light from the scene transmitted through an optical element having a predetermined pattern and superimposed on the line sensor or the area sensor;

generating a captured image of the scene by reconstructing the, observation data, wherein, in the optical element, an autocorrelation function of the predetermined pattern including a plurality of basic patterns repeated while being periodically positionally displaced has a peak and side lobes, and the side lobes are constant or substantially constant.

REFERENCE SIGNS LIST 10, 10a, 10b, 10c, 10d, 10e BINARY MASK
12 LIGHT TRANSMISSION FILTER
14 LIGHT NON-TRANSMISSION FILTER.
50 IMAGE SENSOR
52, 52d, 52e, 52f PIXEL
100 IMAGING DEVICE
200 IMAGE PROCESSING APPARATUS
202 ACQUISITION UNIT
204 PROCESSING UNIT
206 OUTPUT UNIT
208 STORAGE UNIT
a, b, c LIGHT SOURCE

The invention claimed is:

1. An imaging device comprising:
a line sensor or an area sensor having an aspect ratio different from an aspect ratio of a scene; and
an optical element having a predetermined pattern and superimposed on the line sensor or the area sensor,
wherein, in the optical element, an autocorrelation function of the predetermined pattern including a plurality of basic patterns repeated while being periodically positionally displaced has a peak and side lobes, and the side lobes are constant or substantially constant.

2. The imaging device according to claim 1,
wherein the optical element has the predetermined pattern including a two-dimensional pattern generated by folding a one-dimensional pattern having an autocorrelation function of constant or substantially constant side lobes based on a predetermined rule.

3. The imaging device according to claim 1,
wherein the optical element is a binary mask having the predetermined pattern including a plurality of light transmission filters and a plurality of light non-transmission filters arranged in a two-dimensional lattice pattern.

4. The imaging device according to claim 1,
wherein the optical element is a binary mask having the predetermined pattern including a plurality of light transmission filters and a plurality of light non-transmission filters arranged in a Fresnel pattern.

5. The imaging device according to claim 1, wherein the optical element is a diffraction grating.

6. The imaging device according to claim 1, wherein the line sensor or the area sensor has one or more rows including a plurality of pixels.

7. The imaging device according to claim 6, wherein the area sensor operates in a rolling shutter system that acquires observation data at different timings for each of the rows.

8. The imaging device according to claim 6, wherein the line sensor or the area sensor operates in a global shutter system in which the plurality, of pixels simultaneously acquire observation data.

9. The imaging device according to claim 1, comprising a plurality of the optical elements.

10. The imaging device according to claim 1, wherein the optical element encodes each of observation data based on light from each point of the scene acquired in a superimposed manner in each region of the line sensor or the area sensor.

11. The imaging device according to claim 1, wherein the imaging device is a lensless camera.

12. An optical element comprising a predetermined pattern and superimposed on a line sensor or an area sensor haying an aspect ratio different from an aspect ratio of a scene,
wherein, in the optical element, an autocorrelation function of the predetermined pattern including a plurality of basic patterns repeated while being periodically positionally displaced has a peak and side lobes, and the side lobes are constant or substantially constant.

13. An image processing system comprising:
an acquisition unit that acquires observation data observed by a line sensor or an area sensor having an aspect ratio different from an aspect ratio of a scene based on light from the scene transmitted through an optical element having a predetermined pattern and superimposed on the line sensor or the area sensor; and
a processing unit that generates a captured image of the scene by reconstructing the observation data,
wherein, in the optical element, an autocorrelation function of the predetermined pattern including a plurality of basic patterns repeated while being periodically positionally displaced has a peak and side lobes, and the side lobes are constant or substantially constant, and
wherein the acquisition unit and the processing unit are each implemented via at least one processor.

14. An image processing method comprising:
acquiring observation data observed by a line sensor or an area sensor having an aspect ratio different from an aspect ratio of a scene based on light from the scene transmitted through an optical element having a predetermined pattern and superimposed on the line sensor or the area sensor;
generating a captured image of the scene by reconstructing the observation data,
wherein, in the optical element, an autocorrelation function of the predetermined pattern including a plurality of basic patterns repeated while being periodically positionally displaced has a peak and side lobes, and the side lobes are constant or substantially constant.

* * * * *